(12) United States Patent
Ide et al.

(10) Patent No.: US 12,505,412 B2
(45) Date of Patent: Dec. 23, 2025

(54) AUTHENTICATION METHOD, AUTHENTICATION SYSTEM, AND PROGRAM

(71) Applicant: Asahi Kasei Kabushiki Kaisha, Tokyo (JP)

(72) Inventors: Youichiroh Ide, Tokyo (JP); Hideaki Yonekubo, Tokyo (JP); Takahiro Saito, Tokyo (JP); Naoki Horie, Tokyo (JP); Takeshi Ishii, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 226 days.

(21) Appl. No.: 18/034,359

(22) PCT Filed: Oct. 29, 2021

(86) PCT No.: PCT/JP2021/040071
§ 371 (c)(1),
(2) Date: Apr. 27, 2023

(87) PCT Pub. No.: WO2022/092278
PCT Pub. Date: May 5, 2022

(65) Prior Publication Data
US 2023/0394444 A1 Dec. 7, 2023

(30) Foreign Application Priority Data

Oct. 30, 2020 (JP) .................................. 2020-182850
Oct. 30, 2020 (JP) .................................. 2020-182890
Oct. 30, 2020 (JP) .................................. 2020-183115

(51) Int. Cl.
*G06Q 30/00* (2023.01)
*G06Q 10/083* (2024.01)
(Continued)

(52) U.S. Cl.
CPC ........... *G06Q 10/30* (2013.01); *G06Q 10/083* (2013.01); *G06Q 50/04* (2013.01)

(58) Field of Classification Search
None
See application file for complete search history.

(56) References Cited

U.S. PATENT DOCUMENTS

2003/0191675 A1  10/2003  Murashita
2004/0215351 A1  10/2004  Kiire et al.
(Continued)

FOREIGN PATENT DOCUMENTS

CN    1573612 A    2/2005
CN    1311920 C    4/2007
(Continued)

OTHER PUBLICATIONS

Policy Tools for Electronics Recycling Characteristics of a specific certificate market design. P. Bohr, Proceedings of the 2006 IEEE International Symposium on Electronics and the Environment, 2006., Scottsdale, Az, USA, 2006, pp. 132-137, doi: 10.1109/ISEE.2006.1650049. (Year: 2006).*

(Continued)

*Primary Examiner* — Matthew T Sittner
(74) *Attorney, Agent, or Firm* — Morgan, Lewis & Bockius LLP

(57) ABSTRACT

A new technology to assist the recycling of resources is provided. Provided is an authentication method for a recycled product performed by a computer system, the authentication method including: a first acquisition step of acquiring information on a receiving amount of a recycled resin in a manufacturing entity of a resin product; a second acquisition step of acquiring information on a sending amount of a resin product using the recycled resin in the manufacturing entity or a different manufacturing entity; and (Continued)

an authentication step of giving authentication to the resin product when an authentication condition based on the information on the sending amount and the receiving amount is satisfied.

19 Claims, 21 Drawing Sheets

(51) Int. Cl.
*G06Q 10/30* (2023.01)
*G06Q 50/04* (2012.01)

(56) References Cited

U.S. PATENT DOCUMENTS

| | | | |
|---|---|---|---|
| 2005/0015181 | A1 | 1/2005 | Morii |
| 2005/0033667 | A1 | 2/2005 | Sugimoto et al. |
| 2005/0039816 | A1* | 2/2005 | Maguire ............ B65G 53/528 |
| | | | 141/8 |
| 2005/0166380 | A1 | 8/2005 | Ishida et al. |
| 2011/0000402 | A1* | 1/2011 | Grasso, Jr. ............ C04B 28/04 |
| | | | 106/713 |
| 2011/0184077 | A1* | 7/2011 | Goto ..................... C08J 11/14 |
| | | | 423/325 |
| 2013/0332247 | A1* | 12/2013 | Gu ..................... G06Q 10/30 |
| | | | 705/14.11 |
| 2013/0339264 | A1 | 12/2013 | Hattori et al. |
| 2015/0154568 | A1* | 6/2015 | Gu ..................... G06Q 10/30 |
| | | | 705/308 |
| 2018/0179135 | A1* | 6/2018 | Krupa ..................... B01D 3/36 |
| 2018/0323964 | A1 | 11/2018 | Watanabe et al. |
| 2019/0005507 | A1 | 1/2019 | Rodoni et al. |
| 2020/0074513 | A1 | 3/2020 | Alongi |
| 2022/0005002 | A1 | 1/2022 | Graf von Stauffenberg |
| 2022/0309476 | A1* | 9/2022 | Chen ..................... G06Q 10/30 |

FOREIGN PATENT DOCUMENTS

| | | | |
|---|---|---|---|
| CN | 110263952 | A | 9/2019 |
| EP | 3705197 | A1 | 9/2020 |
| JP | 2002-149804 | A | 5/2002 |
| JP | 2002-225030 | A | 8/2002 |
| JP | 2003-203172 | A | 7/2003 |
| JP | 2003-256016 | A | 9/2003 |
| JP | 2003-296518 | A | 10/2003 |
| JP | 2004-030520 | A | 1/2004 |
| JP | 2004-074507 | A | 3/2004 |
| JP | 2004-110343 | A | 4/2004 |
| JP | 2004-265106 | A | 9/2004 |
| JP | 2004-321968 | A | 11/2004 |
| JP | 2004-334538 | A | 11/2004 |
| JP | 2005-056127 | A | 3/2005 |
| JP | 2005-169898 | A | 6/2005 |
| JP | 2005-182360 | A | 7/2005 |
| JP | 2005-202768 | A | 7/2005 |
| JP | 2007-148542 | A | 6/2007 |
| JP | 2009-140448 | A | 6/2009 |
| JP | 2015-151239 | A | 8/2015 |
| JP | 2017-091149 | A | 5/2017 |
| JP | 2018-169764 | A | 11/2018 |
| JP | 2019-003429 | A | 1/2019 |
| WO | 2012/117494 | A1 | 9/2012 |
| WO | 2020/182672 | A1 | 9/2020 |

OTHER PUBLICATIONS

International Preliminary Report on Patentability and Written Opinion issued in corresponding International Patent Application No. PCT/JP2021/040071 dated May 11, 2023.
Supplementary European Search Report issued in European Patent Application No. 21886395.9 dated Mar. 14, 2024.
International Search Report issued in corresponding International Patent Application No. PCT/JP2021/040071 dated Jan. 25, 2022.

* cited by examiner

Fig. 5D

| ID OF RESIN PRODUCT | SHIPMENT AMOUNT OF RESIN PRODUCT | STOCK AMOUNT OF RESIN PRODUCT | DISCARD AMOUNT OF RESIN PRODUCT | RECYCLING RATIO OF RESIN PRODUCT | ID OF RECYCLED RESIN 1 | AUTHENTICATION OF RECYCLED RESIN 1 | USE AMOUNT OF RECYCLED RESIN 1 | DELIVERING AMOUNT OF RECYCLED RESIN 1 | ID OF RECYCLED RESIN 2 | AUTHENTICATION OF RECYCLED RESIN 2 | USE AMOUNT OF RECYCLED RESIN 2 | DELIVERING AMOUNT OF RECYCLED RESIN 2 | ADDITIVE AMOUNT |
|---|---|---|---|---|---|---|---|---|---|---|---|---|---|
| 1000 | 600 | 350 | 50 | 0.80 | 2000 | YES | 400 | 1000 | 3000 | YES | 400 | 1000 | 200 |
| 1001 | 400 | 600 | 0 | 0.50 | 2001 | YES | 500 | 1000 | - | - | - | - | 500 |
| 1002 | 900 | 0 | 100 | 0.80 | 2002 | YES | 500 | 1000 | 3001 | YES | 800 | 2000 | 200 |
| ⋮ | ⋮ | ⋮ | ⋮ | ⋮ | ⋮ | ⋮ | ⋮ | ⋮ | ⋮ | ⋮ | ⋮ | ⋮ | ⋮ |

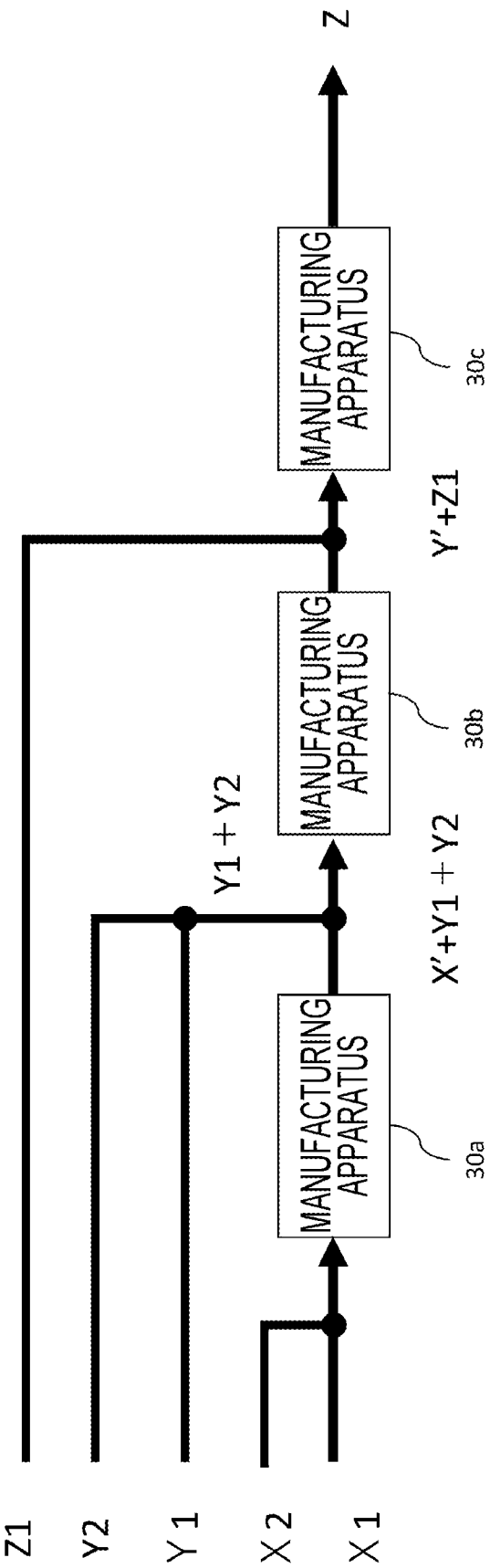

AUTHENTICATION METHOD, AUTHENTICATION SYSTEM, AND PROGRAM

TECHNICAL FIELD

The present invention relates to an authentication method, an authentication system, and a program.

BACKGROUND ART

In recent years, there has been great interest in recycling. Particularly, interest in circular economy representing the way of economy to circulate resources to repeatedly use the same is increasing. Patent Document 1 discloses a technology to assist the operation of circular economy with a computer system.

CITATION LIST

Patent Document

Patent Document 1: Patent Publication JP-A-2019-3429

SUMMARY

Technical Problem

With an increase in interest in circular economy, a new technology to assist the recycling of resources has been demanded.

The present invention has been made in view of the above and has an object of providing a new technology to assist the recycling of resources.

Solution to Problem

The present invention includes the following embodiments.

[1] An authentication method for a recycled product performed by a computer system, the authentication method including:
  a first acquisition step of acquiring information on an inflow amount (a receiving amount) of a recycled resin in a manufacturing entity of a resin product;
  a second acquisition step of acquiring information on an outflow amount (a sending amount) of a resin product using the recycled resin in the manufacturing entity or a different manufacturing entity; and
  an authentication step of giving authentication to the resin product when an authentication condition based on the information on the inflow amount (the sending amount) and the outflow amount (the receiving amount) is satisfied.

[2] The authentication method according to [1], wherein the authentication condition includes a condition that the inflow amount (the sending amount) does not exceed the receiving amount.

[3] The authentication method according to [1] or [2], including:
  a third acquisition step of acquiring information on a recycling ratio about the resin product, wherein the authentication condition includes a condition that the inflow amount(the receiving amount)≥the outflow amount(the sending amount)×the recycling ratio                                   relational expression (A1):

is satisfied.

[4] The authentication method according to [1] or [2], wherein
  the inflow amount (the receiving amount) includes a delivery amount of the recycled resin in a manufacturing company of the resin product, and the outflow amount (the sending amount) includes a shipment amount of the resin product using the recycled resin.

[5] The authentication method according to [4], wherein the authentication condition includes a condition that the delivery amount does not exceed the shipment amount.

[6] The authentication method according to [4] or [5], wherein
  the inflow amount (the receiving amount) further includes a use amount of a recycled resin used in processing of the recycled resin, and
  the authentication condition includes a condition that the use amount does not exceed the delivery amount.

[7] The authentication method according to [6], wherein
  in the first acquisition step, information on a use amount of a recycled resin is acquired as the inflow amount (the receiving amount) from a manufacturing apparatus that processes the recycled resin to obtain a resin product.

[8] The authentication method according to [6] or [7], wherein
  the outflow amount (the sending amount) further includes a manufacturing amount of a processed resin product, and
  the authentication condition includes a condition that the manufacturing amount does not exceed the use amount.

[9] The authentication method according to [8], wherein
  in the second acquisition step, information on a manufacturing amount of a resin product is acquired from a manufacturing apparatus that processes a recycled resin to obtain the resin product.

[10] The authentication method according to [8] or [9], including:
  a product stock amount acquisition step of acquiring information on a stock amount after manufacturing about the resin product; and
  a shipment amount acquisition step of acquiring a shipment amount of the resin product, wherein
  the authentication condition further includes a condition that a sum total of the stock amount after manufacturing and the shipment amount does not exceed the manufacturing amount.

[11] The authentication method according to any one of [6] to [10], further including:
  a raw material stock amount acquisition step of acquiring information on a raw material stock amount that is a stock amount of a recycled resin in a manufacturing entity of the resin product, wherein
  the authentication condition further includes a condition that a sum total of the use amount and the raw material stock amount does not exceed the delivery amount.

[12] The authentication method according to any one of [4] to [11], including:
  a third acquisition step of acquiring information on a recycling ratio about the resin product, wherein
  the authentication condition includes a condition that the delivery amount≥the shipment amount×the recycling ratio                                   relational expression (A2):

is satisfied.

[13] The authentication method according to any one of [4] to [12], including:
a fourth acquisition step of acquiring information on a stock amount after manufacturing about the resin product, wherein
the authentication condition includes a condition that the delivery amount≥the shipment amount+the stock amount after manufacturing    relational expression (A3):

is satisfied.

[14] The authentication method according to any one of [4] to [13], including:
a third acquisition step of acquiring information on a recycling ratio about the resin product; and
a fourth acquisition step of acquiring information on a stock amount after processing about the resin product, wherein
the authentication condition includes a condition that the delivery amount≥(the shipment amount+the stock amount after manufacturing)×the recycling ratio    relational expression (A3-1):

is satisfied.

[15] The authentication method according to any one of [4] to [14], including:
a fifth acquisition step of acquiring information on a discard amount about the resin product, wherein
the authentication condition includes a condition that the delivery amount≥the shipment amount+the discard amount    relational expression (A4):

is satisfied.

[16] The authentication method according to any one of [4] to [15], including:
a third acquisition step of acquiring information on a recycling ratio about the resin product; and
a fifth acquisition step of acquiring information on a discard amount about the resin product, wherein
the authentication condition includes a condition that the delivery amount≥(the shipment amount+the discard amount)×the recycling ratio    relational expression (A4-1):

is satisfied.

[17] The authentication method according to any one of [4] to [16], including:
a sixth acquisition step of acquiring information on a transfer amount of the recycled resin transferred from a first company to a second company, wherein
the inflow amount (the receiving amount) is a delivery amount of the recycled resin delivered from the first company to the second company, and
the authentication condition includes a condition that the delivery amount of the recycled resin delivered from the first company to the second company does not exceed the transfer amount.

[18] The authentication method according to any one of [4] to [17], wherein
the delivery amount is an accumulated delivery amount of the recycled resin associated with same identification information for identifying the recycled resin of a prescribed unit.

[19] The authentication method according to any one of [4] to [18], wherein
the shipment amount is an accumulated shipment amount of the resin product associated with same identification information for identifying the recycled resin of a prescribed unit.

[20] The authentication method according to [17], wherein
the transfer amount is an accumulated transfer amount of the recycled resin associated with same identification information for identifying the recycled resin of a prescribed unit.

[21] The authentication method according to any one of [1] to [20], wherein
acquisition of the information includes acquiring the information from a terminal apparatus communicable with the computer system.

[22] The authentication method according to any one of [1] to [21], wherein
the inflow amount (the receiving amount) is a use amount of the recycled resin that is used, and the outflow amount (the sending amount) is a manufacturing amount of a resin product using the recycled resin.

[23] The authentication method according to [22], wherein
the authentication condition includes a condition that the use amount does not exceed the manufacturing amount.

[24] The authentication method according to or [23], including:
a third acquisition step of acquiring information on a recycling ratio about the resin product, wherein
the authentication condition includes a condition that the use amount≥the manufacturing amount×the recycling ratio    relational expression (B1):

is satisfied.

[25] The authentication method according to any one of to [24], including:
a fifth acquisition step of acquiring information on a discard amount about the resin product, wherein
the authentication condition includes a condition that the use amount≥the manufacturing amount+the discard amount    relational expression (B2):

is satisfied.

[26] The authentication method according to any one of to [25], including:
a third acquisition step of acquiring information on a recycling ratio about the resin product; and
a fifth acquisition step of acquiring information on a discard amount about the resin product, wherein
the authentication condition includes a condition that the use amount≥(the manufacturing amount+the discard amount)×the recycling ratio    relational expression (B2-1):

is satisfied.

[27] The authentication method according to any one of to [26], including:
a sixth acquisition step of acquiring information on a transfer amount of the recycled resin transferred from the first company to the second company, wherein
the inflow amount (the receiving amount) is a use amount of the recycled resin that is delivered from the first company to the second company and used, and
the authentication condition includes a condition that the use amount of the recycled resin delivered from the first company to the second company does not exceed the transfer amount.

[28] The authentication method according to any one of to [27], wherein
the use amount is an accumulated use amount of the recycled resin associated with same identification information for identifying the recycled resin of a prescribed unit.
[29] The authentication method according to [28], wherein
the manufacturing amount is an accumulated manufacturing amount of the resin product associated with the same identification information.
[30] The authentication method according to [27], wherein
the transfer amount is an accumulated transfer amount of the recycled resin associated with same identification information for identifying the recycled resin of a prescribed unit.
[31] The authentication method according to any one of to [30], wherein
acquisition of the information includes acquiring the information from a terminal apparatus communicable with the computer system.
[32] The authentication method according to any one of [1] to [31], wherein
the computer system includes a plurality of node apparatuses, and
each of the plurality of node apparatuses includes
performing, with a control unit, consensus building processing to share the information with another of the node apparatuses, and
storing, in a storage unit, the information for which a consensus has been built by the consensus building processing.
[33] The authentication method according to [32], wherein
the acquisition of the information includes acquiring the information from the storage unit of at least a part of the plurality of node apparatuses.
[34] The authentication method according to or [33], wherein
at least the part of the plurality of node apparatuses includes
performing, with the control unit, the consensus building processing on authentication information showing that the resin product authenticated as a recycled product is the recycled product, and
storing, in the storage unit, the authentication information having been subjected to the consensus building processing.
[35] The authentication method according to any one of [1] to [34], wherein
the computer system includes a blockchain network.
[36] An authentication system including a processor, wherein
the processor is configured to perform:
a first acquisition step of acquiring information on an inflow amount (a receiving amount) of a recycled resin in a manufacturing entity of a resin product;
a second acquisition step of acquiring information on an outflow amount (a sending amount) of a resin product using the recycled resin in the manufacturing entity or a different manufacturing entity; and
an authentication step of giving authentication to the resin product when an authentication condition based on the information on the outflow amount (the sending amount) and the inflow amount (the receiving amount) is satisfied.

[37] The authentication system according to [36], wherein
the authentication system further includes a manufacturing apparatus that processes a recycled resin to obtain a resin product, and
the processor is configured to perform, as the first acquisition step,
a delivery amount acquisition step of acquiring information on a delivery amount of a recycled resin in a manufacturing company of the resin product, and
a use amount acquisition step of acquiring information on a use amount of a recycled resin used in the processing from the manufacturing apparatus,
perform, as the second acquisition step,
a shipment amount acquisition step of acquiring information on a shipment amount of the resin product in a manufacturing company of the resin product, and
perform, as the authentication step,
an authentication step of determining on, a basis of the information on the delivery amount, the use amount, and the shipment amount, that the resin product satisfies an authentication condition when the authentication condition including a condition that the use amount does not exceed the delivery amount and the shipment amount does not exceed the delivery amount is satisfied.
[38] The authentication system according to [37], wherein
the processor is configured to
perform a raw material stock amount acquisition step of acquiring a raw material stock amount that is a stock amount of a recycled resin in a manufacturing entity of the resin product, and
the authentication condition further includes a condition that a sum total of the use amount and the raw material stock amount does not exceed the delivery amount.
[39] The authentication system according to or [38], wherein
the processor is configured to perform
a manufacturing amount acquisition step of acquiring a manufacturing amount of a resin product in a manufacturing entity of the resin product,
a product stock amount acquisition step of acquiring a stock amount after manufacturing that is a stock amount of a resin product in a manufacturing entity of the resin product, and
a shipment amount acquisition step of acquiring a shipment amount of the resin product, and
the authentication condition further includes a condition that a sum total of the stock amount after manufacturing and the shipment amount does not exceed the manufacturing amount.
[40] The authentication system according to any one of to [39], further including:
a sharing step of transmitting, on a premise that the authentication condition is satisfied, target data from a first node apparatus among a plurality of node apparatuses to another of the node apparatuses to share the target data showing that the resin product satisfies the authentication condition.
[41] The authentication system according to any one of to [40], further including:
a plurality of node apparatuses, wherein
a processor of a first node apparatus among the plurality of node apparatuses is configured to perform
the delivery amount acquisition step,
the use amount acquisition step,
the shipment amount acquisition step, the authentication step, and
a sharing step of transmitting, on a premise that the resin product is determined to satisfy the authentication condition, target data to the other node apparatus to share the target data showing that the resin product satisfies the authentication condition with the other node apparatus.

[42] The authentication system according to any one of to [41], wherein
the manufacturing apparatus includes a weighing unit provided to be able to weigh the use amount of the recycled resin, and
in the use amount acquisition step, the use amount is acquired on a basis of a weighing result by the weighing unit.

[43] The authentication system according to any one of to [42], including:
a first reading device that reads a delivery form of the recycled resin, wherein
in the delivery amount acquisition step, information on the delivery amount based on a reading result of the delivery form by the first reading device is acquired.

[44] The authentication system according to any one of to [43], including:
a second reading device that reads a shipment form of a shipment amount of the resin product, wherein
in the shipment amount acquisition step, information on the shipment amount based on a reading result of the shipment form by the second reading device is acquired.

[45] An authentication application system including a processor, wherein the processor is configured to perform:
a first acquisition step of acquiring information on an inflow amount (a receiving amount) of a recycled resin in a manufacturing entity of a resin product;
a second acquisition step of acquiring information on an outflow amount (a sending amount) of a resin product using the recycled resin in the manufacturing entity or a different manufacturing entity;
an authentication application step of transmitting authentication target data including the outflow amount (the sending amount) and the inflow amount (the receiving amount); and
a receiving step of receiving an authentication result showing whether an authentication condition based on the information on the outflow amount (the sending amount) and the inflow amount (the receiving amount) is satisfied.

[46] The authentication application system according to [45], wherein
the authentication application system further includes a manufacturing apparatus that processes a recycled resin to obtain a resin product, and
the processor is configured to perform, as the first acquisition step,
a delivery amount acquisition step of acquiring information on a delivery amount of a recycled resin in a manufacturing company of the resin product, and
a use amount acquisition step of acquiring information on a use amount of a recycled resin used in the processing from the manufacturing apparatus, and
perform, as the second acquisition step,
a shipment amount acquisition step of acquiring information on a shipment amount of the resin product in a manufacturing company of the resin product.

[47] The authentication application system according to [46], wherein
the manufacturing apparatus includes a weighing unit provided to be able to weigh the use amount of the recycled resin, and
in the use amount acquisition step, the use amount is acquired on a basis of a weighing result by the weighing unit.

[48] The authentication application system according to any one of and [47], including:
a first reading device that reads a delivery form of the recycled resin, and
in the delivery amount acquisition step, information on the delivery amount based on a reading result of the delivery form by the first reading device is acquired.

[49] The authentication application system according to any one of to [48], including:
a second reading device that reads a shipment form of a shipment amount of the resin product, wherein
in the shipment amount acquisition step, information on the shipment amount based on a reading result of the shipment form by the second reading device is acquired.

[50] A program for causing a computer system to perform:
a first acquisition step of acquiring information on an inflow amount (a receiving amount) of a recycled resin in a manufacturing entity of a resin product;
a second acquisition step of acquiring information on an outflow amount (a sending amount) of a resin product using the recycled resin in the manufacturing entity; and
an authentication step of giving authentication to the resin product when an authentication condition based on the information on an outflow amount (the sending amount) and the inflow amount (the receiving amount) is satisfied.

[51] An authentication method for a recycled product performed by a computer system, the authentication method including:
acquiring supply information showing information on a supply chain of a resin product;
determining whether a recycled resin is used in the resin product on a basis of the supply information; and
giving authentication to the resin product when an authentication condition including a condition that the recycled resin is used is satisfied.

[52] The authentication method according to any one of [1] to [35], further including:
acquiring supply information showing information on a supply chain of a resin product;
determining whether a recycled resin is used in the resin product on a basis of the supply information; and
giving authentication to the resin product when an authentication condition including a condition that the recycled resin is used is satisfied.

[53] The authentication method according to or [52], wherein
the determination includes determining whether authentication by a third party organization on a raw material resin of the resin product is obtained on a basis of the supply information, and
the authentication condition includes a condition that authentication by a third party organization on at least one raw material resin in the supply chain of the resin product is obtained.

[54] The authentication method according to [53], wherein
the authentication condition includes a condition that the authentication by the third party organization is obtained in a recycled resin manufactured from a collected used resin product.

[55] The authentication method according to any one of to [54], wherein
the supply information is information on a supply chain of a resin product using the recycled resin associated with same identification information for identifying the recycled resin of a prescribed unit.

[56] The authentication method according to any one of to [55], wherein
the computer system includes a plurality of node apparatuses, and
each of the plurality of node apparatuses includes
performing, with a control unit, consensus building processing to share the supply information with another of the node apparatuses, and
storing, in a storage unit, the supply information for which a consensus has been built by the consensus building processing.

[57] The authentication method according to [56], wherein
the acquisition of the supply information includes acquiring the supply information from the storage unit of at least a part of the plurality of node apparatuses.

[58] The authentication method according to or [57], wherein
at least the part of the plurality of node apparatuses includes
performing, with the control unit, the consensus building processing on authentication information for the resin product, and
storing, in the storage unit, the authentication information having been subjected to the consensus building processing.

[59] The authentication method according to any one of to [58], wherein
the acquisition of the supply information includes acquiring the supply information from a terminal apparatus communicable with the computer system.

[60] An authentication system including a processor, wherein
the processor is configured to perform:
acquiring supply information showing information on a supply chain of a resin product;
determining whether a recycled resin is used in the resin product on a basis of the supply information; and
giving authentication to the resin product when an authentication condition including a condition that the recycled resin is used is satisfied.

[61] The authentication system according to any one of to [44], wherein
the authentication system is configured to further perform:
acquiring supply information showing information on a supply chain of a resin product;
determining whether a recycled resin is used in the resin product on a basis of the supply information; and
giving authentication to the resin product when an authentication condition including a condition that the recycled resin is used is satisfied.

[62] A program for causing a computer system to perform:
acquiring supply information showing information on a supply chain of a resin product;
determining whether a recycled resin is used in the resin product on a basis of the supply information; and
authenticating the resin product as a recycled product when a recycled resin is determined to be used.

[63] A determination method that is performed by a computer system and relates to a transaction of at least a resin product or a resin including a recycled resin in a supply chain in which a plurality of companies participate, the determination method including:
receiving, from a first company via a first terminal apparatus, shipment information including at least a part of identification information on the resin shipped by the first company, shipment destination information on the resin, shipment amount information on the resin, and shipment timing information on the resin;
receiving, from a second company via a second terminal apparatus, delivery information on the resin delivered to the second company; and
making a transaction determination that is a determination as to validity of the transaction on a basis of the shipment information and the delivery information.

[64] The determination method according to [63], wherein
the transaction determination includes a determination as to whether the shipment information and the delivery information match to each other.

[65] The determination method according to or [64], wherein
the delivery information includes approval information showing whether the shipment information is approved, and
the transaction determination includes determining validity of shipment of the resin on a basis of the approval information corresponding to the delivery information.

[66] The determination method according to any one of to [65], wherein
the transaction determination includes making a determination as to validity of a plurality of transactions accompanied by circulation of the resin occurring between the first company and the second company in the supply chain.

[67] The determination method according to any one of to [66], wherein
the computer system includes a plurality of node apparatuses, and
each of the plurality of node apparatuses includes
performing, with a control unit, consensus building processing to share the shipment information and the delivery information with another of the node apparatuses, and
storing, in a storage unit, the shipment information and the delivery information for which a consensus has been built by the consensus building processing.

[68] The determination method according to any one of to [67], wherein
the computer system includes a plurality of node apparatuses, and
each of the plurality of node apparatuses includes
performing, with the control unit, consensus building processing to share transaction validity information showing a result of the transaction determination with another of the node apparatuses, and storing, in the storage unit, the transaction validity information for which a consensus has been built by the consensus building processing.

[69] A determination system including a processor for performing a determination method that relates to a transaction of at least a resin product or a resin including a recycled resin in a supply chain in which a plurality of companies participate, wherein the determination system is configured to perform:

receiving, from a first company via a first terminal apparatus, shipment information including at least a part of identification information on the resin shipped by the first company, shipment destination information on the resin, shipment amount information on the resin, and shipment timing information on the resin;

receiving, from a second company via a second terminal apparatus, delivery information on the resin delivered to the second company; and making a transaction determination that is a determination as to validity of the transaction on a basis of the shipment information and the delivery information.

[70] A program for causing a computer to perform, in order to perform a determination method that relates to a transaction of at least a resin product or a resin including a recycled resin in a supply chain in which a plurality of companies participate:

receiving, from a first company via a first terminal apparatus, shipment information including at least a part of identification information on the resin shipped by the first company, shipment destination information on the resin, shipment amount information on the resin, and shipment timing information on the resin;

receiving, from a second company via a second terminal apparatus, delivery information on the resin delivered to the second company; and making a transaction determination that is a determination as to validity of the transaction on a basis of the shipment information and the delivery information.

Advantageous Effects of Invention

According to the present invention, a new technology to assist the recycling of resins can be provided.

BRIEF DESCRIPTION OF DRAWINGS

FIG. 5D is a conceptual diagram showing an example of a resin product information database according to an embodiment.

FIG. 16 is a diagram for describing the outline of a manufacturing step for resin products according to an embodiment.

DESCRIPTION OF EMBODIMENTS

Hereinafter, an information processing system according to an embodiment of the present invention will described in detail with reference to the drawings. However, the following embodiment is merely given as an example and does not intend to exclude various modifications or the application of technologies not explicitly pointed out below. That is, the present invention can be variously modified without departing from its gist or can be implemented by the combination of respective Examples or the like. Further, in the following descriptions of the drawings, the same or similar portions will be denoted by the same or similar symbols.

<System Configuration>

Figure 1:
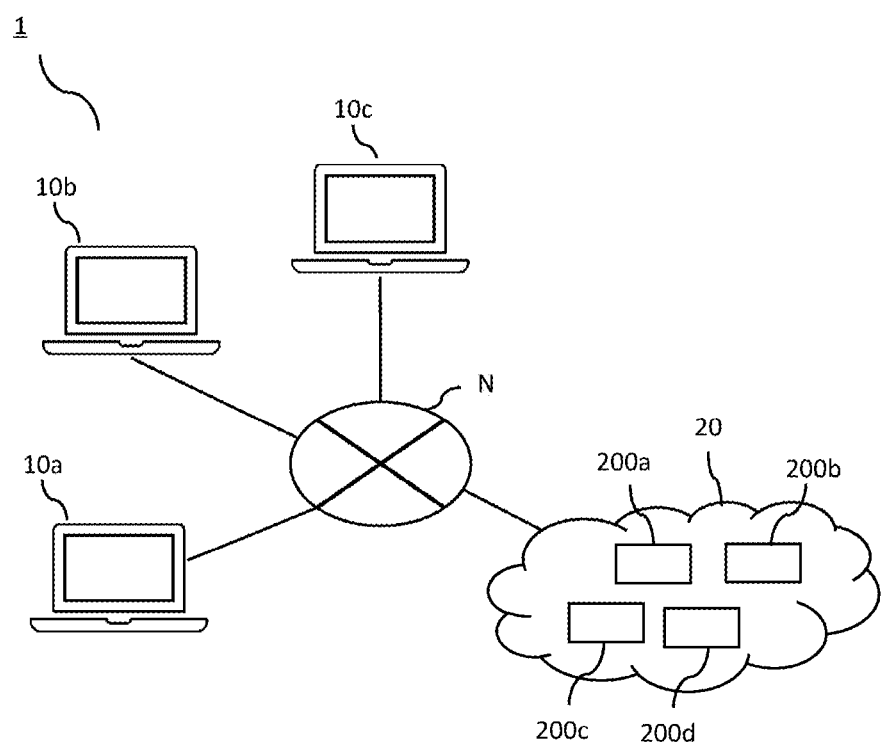
FIG. 1 is a conceptual diagram showing an example of the configuration of an information processing system according to an embodiment.

An example of the configuration of an information processing system according to an embodiment will be described with reference to FIG. 1. An information processing system 1 is a system for assisting the recycling of resources. The information processing system 1 stores and manages, for example, information on any product or material such as a resin product or a resin material and determines whether to give authentication showing a recycled product to the product or determines whether a recycled resin has been moved (for example, transferred). The information processing system 1 includes terminal apparatuses 10a, 10b, and 10c and a blockchain network 20. The terminal apparatuses 10a, 10b, and 10c and the blockchain network 20 are communicable with each other via a network N. In the example shown in FIG. 1, the information processing system 1 includes the three terminal apparatuses. However, the number of the terminal apparatuses is arbitrarily set and may be two or less or four or more. Each of the terminal apparatuses 10a, 10b, and 10c may have the same configurations or different configurations. In an embodiment, the terminal apparatuses 10a, 10b, and 10c are, when referred to without being distinguished from each other, generically called terminal apparatuses 10.

The terminal apparatuses 10 are information processing apparatuses used by users who use services offered by the information processing system 1. The terminal apparatuses 10 may be, for example, personal computers, smart phones, tablet terminals, PDAs (Personal Digital Assistants), or dedicated information processing apparatuses.

The blockchain network 20 is a platform used to use a blockchain technology. The blockchain network 20 has a distributed system processed by a plurality of computers (hereinafter called "node apparatuses") existing on a network. The communication between the node apparatuses is typically performed by P2P (Peer to Peer). With the employment of the P2P, the whole system is not likely to go down even if trouble occurs in a part of the node apparatuses, and the continuity of the system is maintained. In a blockchain, the transaction information between participants is handled as transactions in units of blocks. Respective blocks are connected to each other in a chain shape and stored and managed in the respective node apparatuses in a chronological order. The approval of new blocks is formed by consensus building processing in a distributed network. In the respective blocks of the blockchain, the hash values of previous blocks are stored. When the respective blocks are tampered, the hash values are also changed. Therefore, the hash values of following blocks are also needed to be changed. Therefore, the employment of the blockchain technology enables the construction of a high-safety system that is hardly tampered.

The blockchain network 20 is configured to include node apparatuses 200a, 200b, 200c, and 200d. In the example shown in FIG. 1, the four node apparatuses are shown as node apparatuses included in the blockchain network 20. However, the number of the node apparatuses is arbitrarily set and may be three or less or five of more. Each of the node apparatuses 200a, 200b, 200c, and 200d has the same configurations. In an embodiment, the node apparatuses 200a, 200b, 200c, and 200d are, when referred to without being distinguished from each other, generically called node apparatuses 200.

As a modified example, the blockchain network 20 may be replaced by another configuration such as a server apparatus, cloud computing, and edge computing that stores data and perform processing. Further, instead of independently using the blockchain network 20, any of the blockchain network 20, a server apparatus, cloud computing, and edge computing may be used in combination.

The network N is constituted by a wireless network and a wired network. An example of a network is the Internet, a LAN (Local Area Network), a WAN (Wide Area Network), a mobile telephone network, a wireless LAN, 5G (5rd Generation), 4G (4th Generation), LTE (Long Term Evolution), WiMax™, infrared communication, Bluetooth™, a wired LAN, a telephone line, an electric lamp line network, or a network complying with IEEE1394 or the like.

<Hardware Configurations>

An example of the hardware configurations of a computer 100 used to realize information processing apparatuses such as terminal apparatuses 10 and the node apparatuses 200 included in the information processing system 1 according to an embodiment will be described with reference to FIG. 2. Note that the functions of the respective apparatuses by a plurality of computers 100 may be realized.

Figure 2:
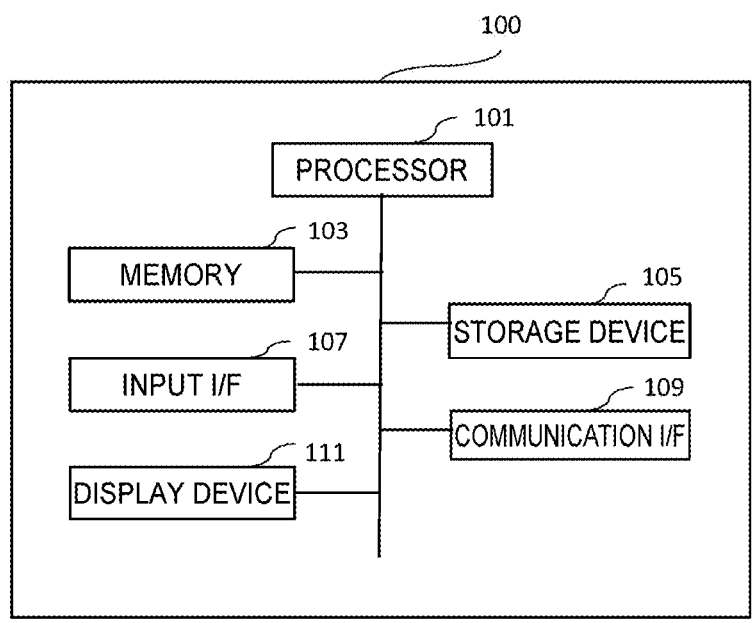
FIG. 2 is a block diagram showing the hardware configurations of the computer system according to an embodiment.

As shown in FIG. 2, the computer 100 includes a processor 101, a memory 103, a storage device 105, an input I/F 107, a communication I/F 109, and a display device 111. The computer 100 may not include a part of the above configurations or may include other configurations in addition to the above configurations.

The processor 101 is a control unit that performs various processing in the computer 100 and controls the respective configurations in the computer 100 by running a program stored in the memory 103.

The memory 103 is, for example, a storage medium such as a RAM (Random Access Memory). The memory 103 temporarily stores the program code of a program run by the processor 101 or data needed when the program runs.

The storage device 105 is, for example, a non-volatile storage medium such as a hard disk drive (HDD) and a flash memory. The storage device 105 stores an operating system or various programs used to realize the above respective configurations.

The input I/F 107 is a device used to receive input from a user. Specific examples of the input I/F 107 include a keyboard, a mouse, a touch panel, various sensors, a wearable device, or the like. The input I/F 107 may be connected to the computer 100 via, for example, an interface such as a USB (Universal Serial Bus).

The communication I/F 109 is a device used to perform data communication with an apparatus outside the computer 100 via the Internet N in a wired or wireless fashion. The communication I/F 109 is realized by, for example, an NIC (Network Interface Card) or the like.

The display device 111 is a device used to display various information. Specific examples of the display device 111 include a liquid crystal display, an organic EL (Electro-Luminescence) display, a wearable device display, or the like. The display device 111 may be provided outside the computer 100. In this case, the display device 111 is connected to the computer 100 via, for example, a display cable or the like. Further, when a touch panel is employed as the input I/F 107, the display device 111 may be configured to be integrated with the input I/F 107.

<Outline of Recycling>

The outline of the recycling of resins in an embodiment will be described as an example of the recycling of resources with reference to FIG. 3. The information processing system 1 assists the recycling of resources and functions as, for example, a platform for circulating the resources.

Figure 3:
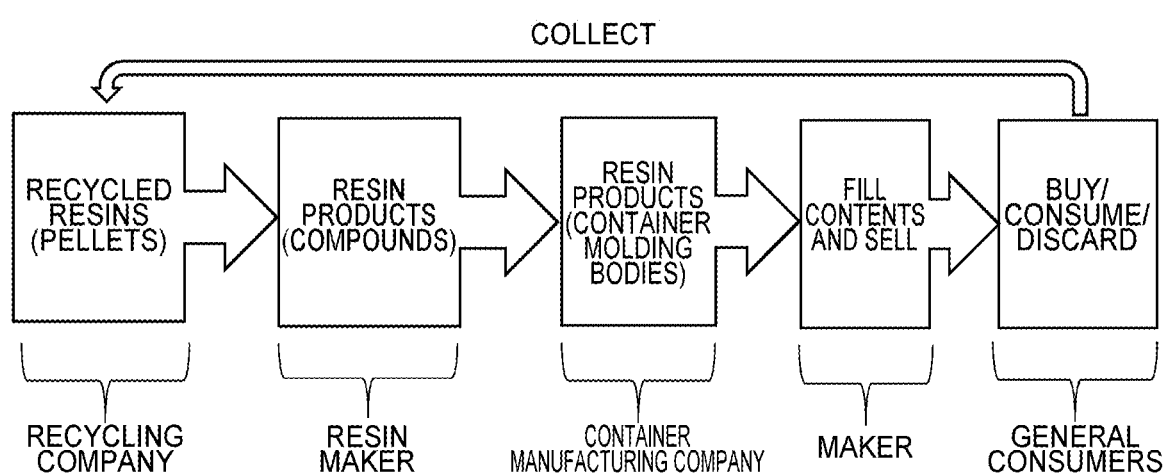
FIG. 3 is a conceptual diagram for describing the outline of the recycling of resins according to an embodiment.

In the example shown in FIG. 3, a recycling company, a resin maker, a container manufacturing company, a maker, and general consumers are involved in the recycling of resins. The recycling company generates recycled resins (for example, recycled pellets) by performing the pulverization, washing, or the like of collected used resin products (for example, containers such as plastic bottles). The resin maker manufactures resin products using the recycled resins obtained from the recycling company. Examples of the resin products manufactured by the resin maker include compounds. Here, the compounds indicate resin compositions including the recycled resins. The container manufacturing company manufactures new resin products (for example, container molding bodies) using the compounds obtained from the resin maker. The content maker sells items in which contents are filled in the container molding bodies obtained from the container manufacturing company as commercial products. The general consumers buy the commercial products sold by the content maker. After being consumed or used by the general consumers, the container molding bodies are collected and subjected to the processing of the recycling company.

The meanings or outlines of terms used in the present disclosure will be described below with reference to FIGS. 3 and 4.

Figure 4A:
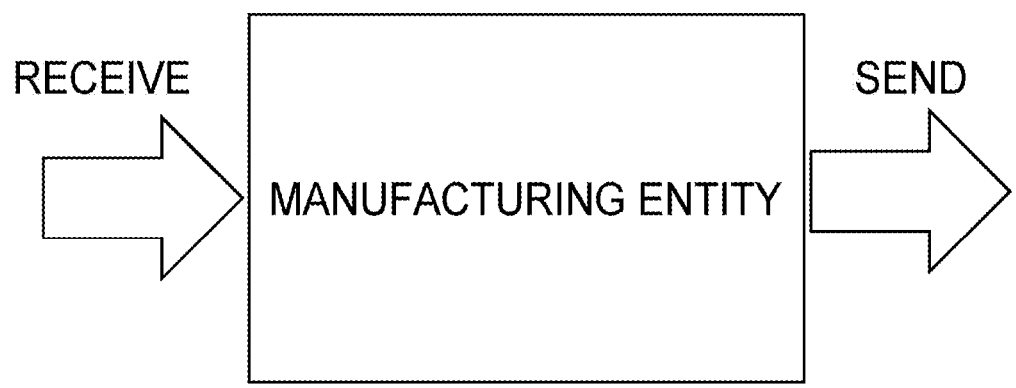
FIG. 4A is a conceptual diagram for describing the outline of the recycling of resins according to an embodiment.

As shown in FIG. 4A, the information processing system 1 manages, for example, the receiving amount and sending amount of resins handled by a manufacturing entity.

"Manufacturing Entity": A manufacturing entity indicates an entity that manufactures resin products using resins (for example, recycled resins) received as materials and sends the manufactured resin products. Examples of the manufacturing entity include an arbitrary entity that manufactures resin products and include a company that manufactures resin products or a manufacturing apparatus that manufactures resin products. The manufacturing of resin products also includes the filling of contents in container molding bodies.

"Flowing in" ("Receiving") and "Flowing out" ("Sending"): "Flowing in" ("Receiving") indicates resins flowing in (received) by the manufacturing entity. "Flowing out" ("Sending") indicates resin products flowing out (sent) from the manufacturing entity. For example, when the manufacturing entity is a resin maker, recycled resins are flowing in (received). When the manufacturing entity is a container manufacturing company, compounds are flowing in (received). Note that the "flowing in" ("receiving") and "flowing out" ("sending") may be flowing in (receiving) and flowing out (sending) to and from a company (an entity) or may be "flowing in" ("receiving") and "flowing out" ("sending") to and from a manufacturing apparatus. The unit of an amount in an inflow amount (a receiving amount) and an outflow amount (a sending amount) may be arbitrarily set. The unit of an "amount" may be, for example, the unit of mass such as gram, kilogram, and ton.

"Recycled Resins" and "Resin Products": "Recycled resins" used as the materials of resin products and the "resin products" are in a corresponding meaning relationship. In the example shown in FIG. 3, the recycling company uses collected recycled resin products as "recycled resins" and manufactures recycled pellets as "resin products". Further, the resin maker uses the recycled pellets manufactured by the recycling company as "recycled resins" and manufactures compounds as "resin products". Further, the container manufacturing company uses the compounds manufactured by the resin maker as "recycled resins" and manufactures containers as "resin products".

Figure 4B:
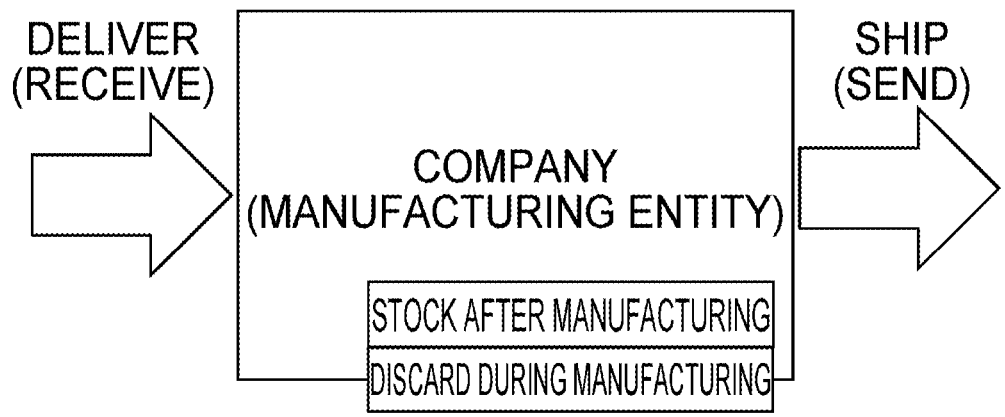
FIG. 4B is a conceptual diagram for describing the outline of the recycling of resins according to an embodiment.
Figure 4C:
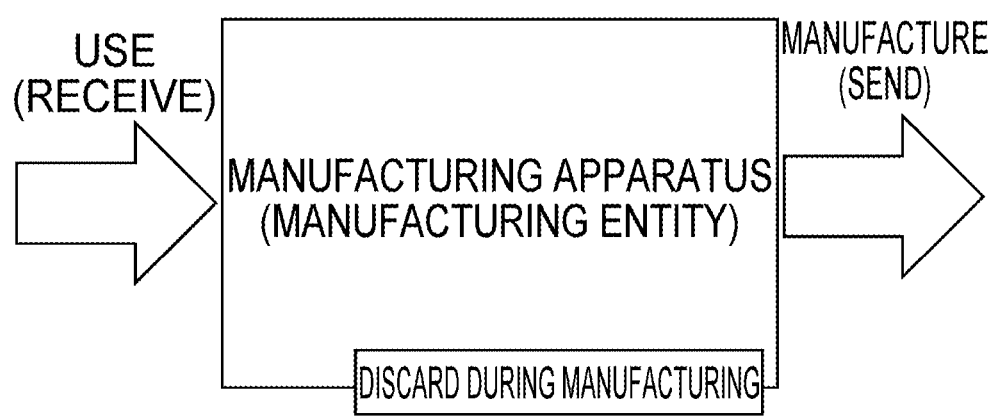
FIG. 4C is a conceptual diagram for describing the outline of the recycling of resins according to an embodiment.

"Company": A company indicates an entity that manufactures resin products using delivered resins and ships the manufactured resin products, and indicates a mode of a manufacturing entity. The recycling company, the resin maker, the container manufacturing company, or a maker shown in FIG. 3 will be called a company. However, in the present disclosure, the maker will be called a company in some cases for convenience. As shown in FIG. 4B, a company stores resin products before shipment after manufacturing the resin products. The amount of the resin products will be called a stock amount after manufacturing. Further, the discard of recycled resins or resin products occurs for any reason during the manufacturing of the resin products or the like in the company. The amount of the discard will be called a "discard amount".

"Delivery" and "Shipment": "Receiving" of recycled resins by a company will be called "delivery" in some cases. Further, "sending" of resin products by a company will be called "shipment" in some cases.

"Manufacturing Apparatus": A manufacturing apparatus indicates an entity that manufactures resin products using recycled resins as materials, and indicates a mode of a manufacturing entity. Examples of the manufacturing apparatus include an apparatus for mixing, an apparatus for molding, an apparatus for decomposing resins, an apparatus for polymerizing resins, or an apparatus in which the functions of these apparatuses are combined together. Examples of these apparatuses for mixing include an extruder such as a single-screw extruder and a twin-screw extruder, a mixer that stirs pellets, or the like. Examples of the apparatus for molding include an injection molding machine, a bottle molding machine (blow molding machine), a laminator, a film manufacturing apparatus, a biaxial stretching apparatus, a spinning apparatus, a cutter that cuts off rod-shaped resins into a pellet shape, or the like. Examples of the apparatus for decomposing resins include a liquefying apparatus that liquefies recycled resins, a cracker that cracks recycled resins, or the like. As show in FIG. 4C, the discard of recycled resins occurs for any reason during the manufacturing of resin products in a manufacturing apparatus. The amount of the discard will also be called a discard amount. For example, the manufacturing apparatus may also be an apparatus that manufactures recycled pellets using collected recycled resin products as materials or may be an apparatus that manufactures compounds using recycled pellets mainly used by a resin maker as materials. More specifically, examples of the apparatus that manufactures recycled pellets include an extruder such as a single-screw extruder and a twin-screw extruder or the like.

"Use" and "Manufacturing": The "receiving" of recycled resins in a manufacturing apparatus will be called "use" in some cases. Further, the "sending" of recycled resins in a manufacturing apparatus will be called "manufacturing" in some cases.

"Recycling Ratio": A recycling ratio indicates the ratio of the amount of recycled resins to the whole amount of resin products.

"Giving of Authentication": The giving of authentication indicates the giving of prescribed information or right when authentication conditions are satisfied. The authentication may be recycling authentication that shows recycled products on a screen and an output destination such as a form or may be right to rewrite information on a blockchain network.

"Recycling": Recycling indicates the use of waste plastic materials. The recycling may be material recycling in which waste plastic materials are reused as plastic product materials or may be chemical recycling in which waste plastic materials are chemically decomposed and reused as chemical product materials.

In making a determination as to whether authentication conditions are satisfied, a mass balance approach applied to a biomass field may be employed. The mass balance approach indicates a method in which the weight portions of input recycled materials in manufactured resin products are regarded as recycled resins. For example, when 10% of the raw materials of manufactured resin products are recycled resins and the other materials are virgin resins or the like, authentication processing is performed with 10% of the manufactured resin products regarded as recycling-authenticated resin products which is 100% made of the recycled resins and the remaining 90% thereof regarded as unauthenticated resin products by the mass balance approach. In this case, the sending amount of the resin products is the sending amount of the recycling-authenticated resin products, and the receiving amount thereof is the receiving amount of the recycled resins.

Hereinafter, an example of information processing according to respective embodiments will be described. In the following description, the respective configurations shown in FIGS. 1 to 4 will be appropriately referred to.

1. First Embodiment

In the present embodiment, the blockchain network 20 acquires information on the receiving amount of recycled resins in the manufacturing entity of resin products and acquires information on the sending amount of resin products using the recycled resins in the manufacturing entity. When the sending amount of the recycled resins does not exceed the receiving amount of the resin products, the blockchain network 20 authenticates the resin products as recycled products. In the present embodiment, the information processing system 1, the blockchain network 20, or one of the node apparatuses 200 in the blockchain network 20 can be specified as an authentication system.

The information processing system 1 of the present embodiment is a system used to authenticate resin products as recycled products on the basis of information on the receiving amount of recycled resins in the manufacturing entity of the resin products and information on the sending amount of the resin products using the recycled resins in the manufacturing entity. According to the information processing system 1, resin products can be authenticated as recycled products with a simple configuration. Further, by referring to authentication information show that resin products are authenticated as recycled products, the users of the resin products can confirm whether the resin products are recycled products. That is, users having keen interest in recycled products can perform the buying or the like of the recycled products on the basis of highly-reliable information, and the circulation of the recycled products is promoted consequently.

<Function Configurations>

Figure 5A:
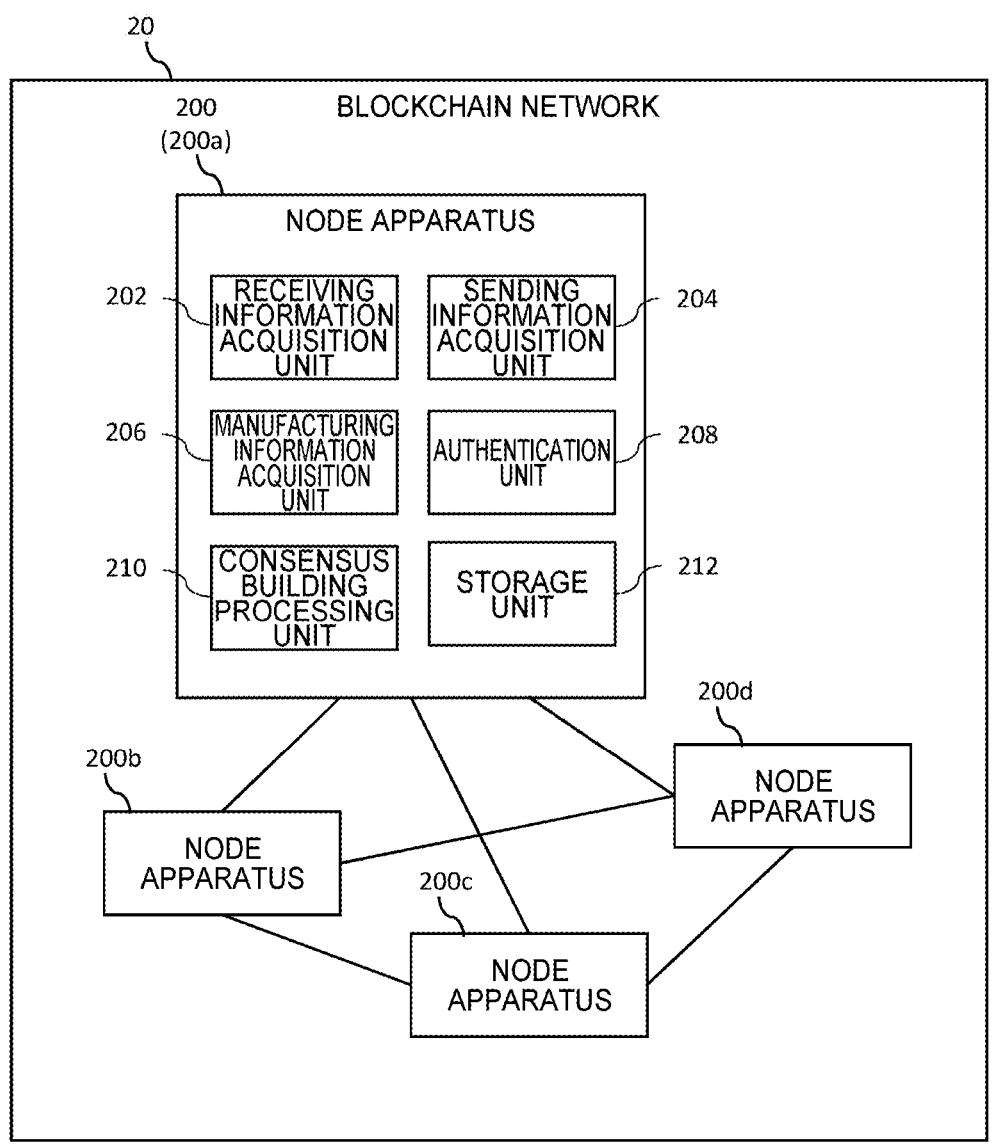
FIG. 5A is a block diagram showing an example of the function configurations of a blockchain network according to a first embodiment.

An example of the functions of the blockchain network 20 will be described with reference to FIG. 5A. In the example shown in FIG. 5A, the respective node apparatuses 200 in the blockchain network 20 include a receiving information acquisition unit 202, a sending information acquisition unit 204, a manufacturing information acquisition unit 206, an authentication unit 208, a consensus building processing unit 210, and a storage unit 212 as main function configurations. These functions are realized when the control unit (processor 101) possessed by the respective node apparatuses 200 reads and runs a computer program stored in the storage device 105.

Figure 5B:
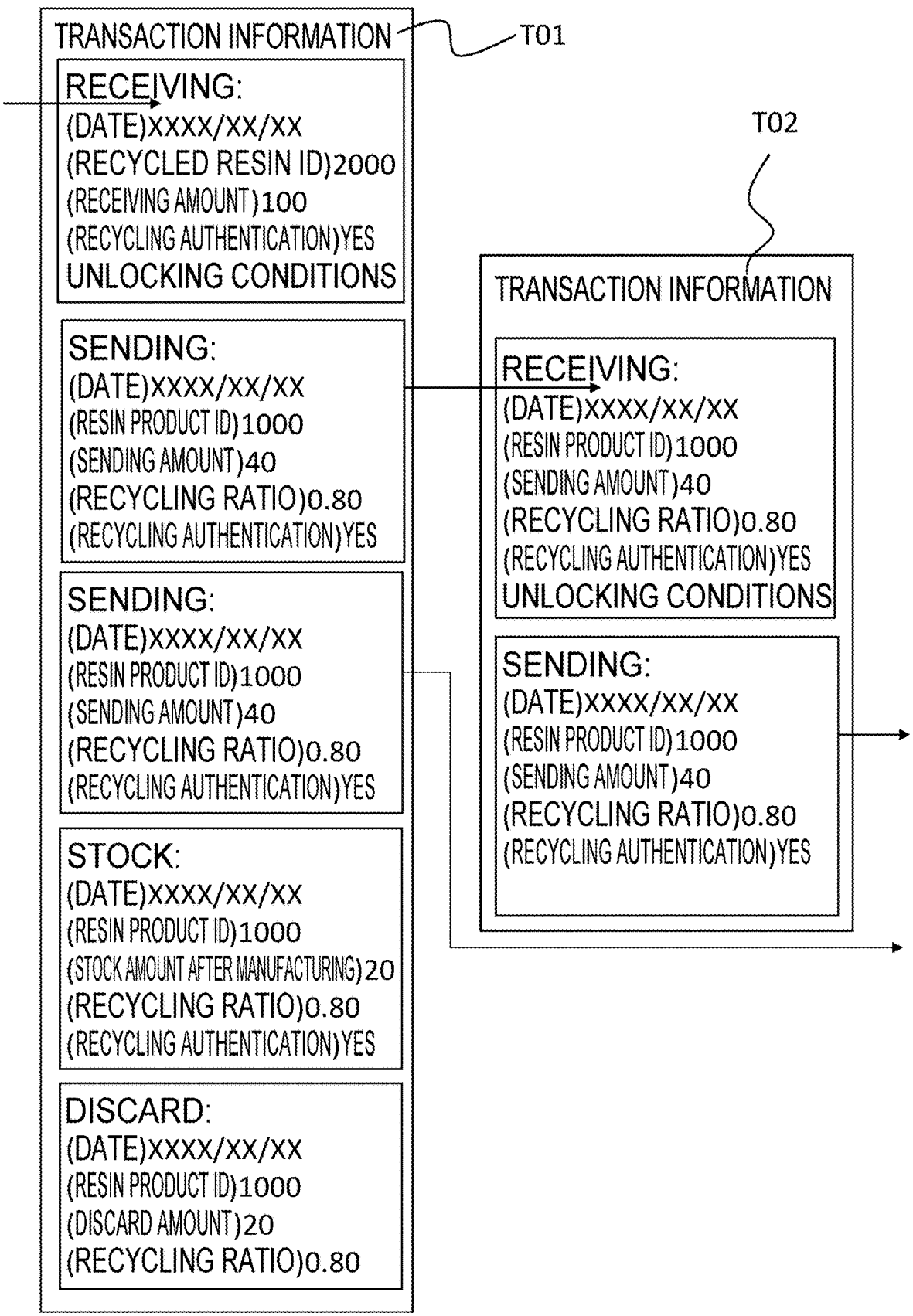
FIG. 5B is a conceptual diagram showing an example of a data structure stored in the blockchain network according to an embodiment.

FIG. 5B schematically shows a part of the data structure of transaction information stored in the storage unit 212. Note that the data structure shown in FIG. 5B is an example and the transaction information may have an arbitrary data structure.

The transaction information includes receiving information and sending information. In the sending information, a date, a sending amount, identification information on a resin product (hereinafter also called a "resin product ID"), a recycling ratio, recycling authentication, and unlocking conditions are, for example, designated. The unlocking conditions are conditions needed when a resin product traded this time is used in another transaction information. Further, the transaction information may include any of a receiving source and a sending destination. As the receiving source or the sending destination, another company, an apparatus type, or the like may be included. For example, when storing and processing are performed in order of a raw material stock, a mixer that mixes a plurality of recycled resin pellets together, a kneading extruder, and a product stock, the raw material stock (receiving from a raw material maker and sending to the mixer), the mixer (receiving from the raw material stock and sending to the kneading extruder), and the kneading extruder (receiving from the mixer and sending to the product stock (manufacturing amount)) may be recorded.

Note that the transaction information may include a plurality of receiving information and sending information.

Note that a resin product that has not been referred to in receiving information on another transaction information among sending information generated in certain transaction information may be stored as stock or discard.

In the stock, a date, a stock amount after manufacturing, a resin product ID, a recycling ratio, recycling authentication, and unlocking conditions are, for example, designated.

In the discard, a date, a stock amount after manufacturing, a resin product ID, a recycling ratio, recycling authentication, and unlocking conditions are, for example, designated.

Here, transaction information T01 has one receiving information and two sending information. In the receiving information, identification information (hereinafter also called a "recycled resin ID"), a date, a receiving amount, recycling authentication, and unlocking conditions on a recycled resin used in a resin product traded this time are designated. Further, in the sending information, a resin product ID, a receiving amount, recycling authentication, and unlocking conditions are designated. As an unlocking condition, the hash value of the public key of a transaction partner may be designated. The hash value of the public key designated as an unlocking condition may be the destination (address) of a resin product designated in the sending information.

As will be described in detail later, transaction information is verified in consensus building processing and stored in a structure called a block when approved.

In transaction information T02, a resin product ID, a date, a receiving amount, recycling authentication, and unlocking conditions are set in receiving information.

Note that the structure of transaction information is not limited to the example of FIG. 4 and the transaction information may have an arbitrary structure.

Figure 5C:
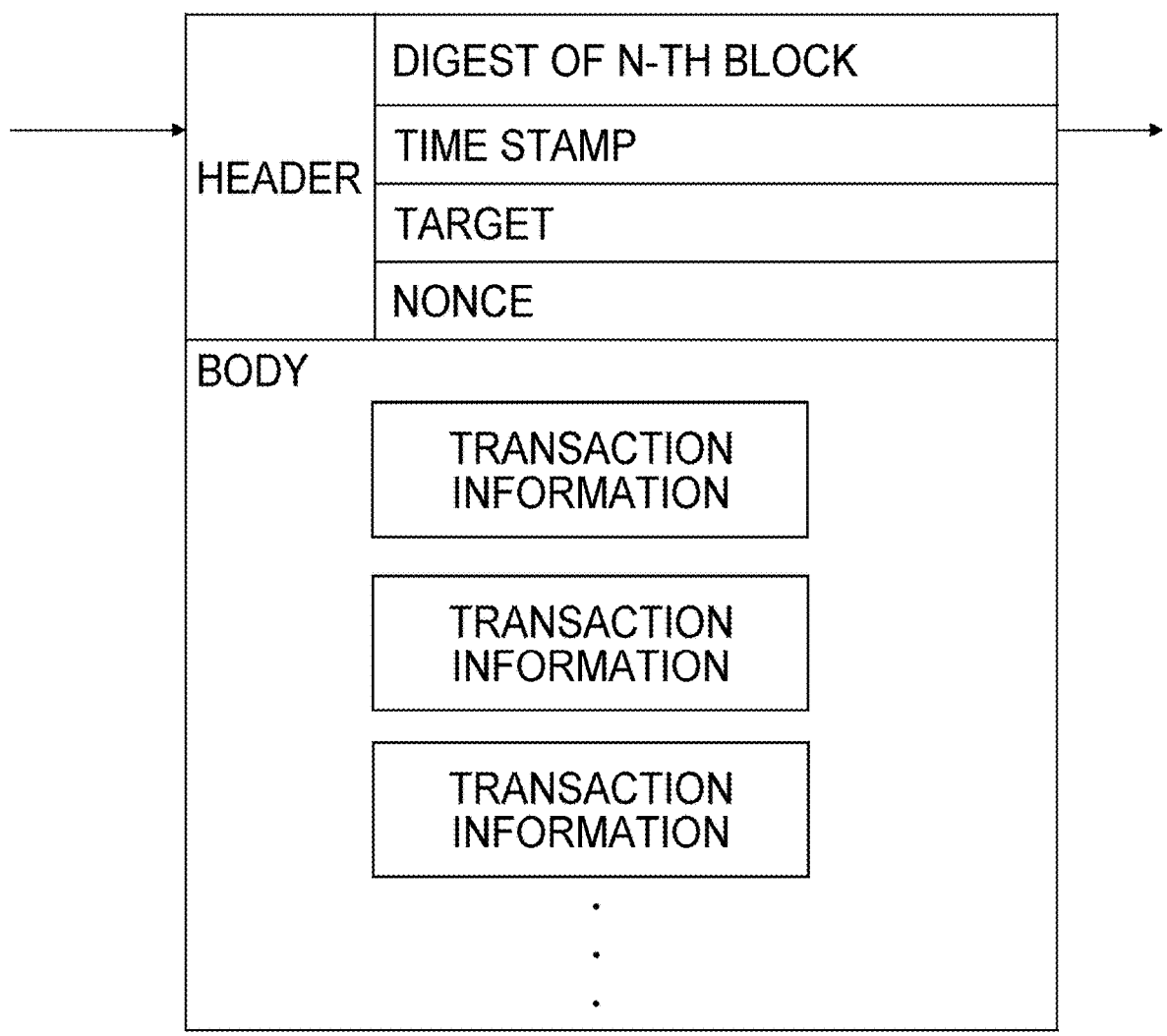
FIG. 5C is a conceptual diagram showing an example of the structure of a block according to an embodiment.

Next, FIG. 5C schematically shows a part of the data structure of a blockchain stored in the storage unit 212. FIG. 5C is a diagram showing the structure of the N+1-th block among blocks arranged in a chronological order.

In the "header" of the block, the digest of the N-th block, a time stamp, a target, and a nonce may be, for example, stored.

In the "digest of the N-th block," identification information used by the respective node apparatuses 200 and the terminals 10 to uniquely identify the N-th block on the blockchain network is, for example, stored. As the digest of the N-th block, the hash value of the block can be, for example, used.

In the "time stamp," a time stamp added when the block is generated or information on a block number is stored.

The "target" and the "nonce" are values used when consensus building processing is performed using, for example, an algorithm such as PBFT (Practical Byzantine Fault Tolerance) and Endorsement-Ordering-Validation. The "target" is a value relating to the difficulty of the consensus building processing. The "nonce" is an arbitrary value generated in the consensus building processing when the block is generated.

The consensus building processing will be specifically described. In the consensus building processing, a nonce is found on the basis of the digest (hash value) of the N+1-th block. When the appropriate nonce is found, the found nonce is stored to generate the N+1-th block. A blockchain node that performs the consensus building processing repeatedly calculates the digest of a block header while changing the value of the nonce for the purpose of finding the appropriate nonce.

In addition, when a blockchain is a private type or consortium type, the consensus building processing may not be performed.

In the "body" of the block, a plurality of transaction information is stored. However, one transaction information may be stored in the "body. The transaction information stored in the block has the same time stamp data.

Note that the structure of the block is not limited to the example of FIG. 5C and the block may have an arbitrary structure.

The recycling authentication will be described below.

The receiving information acquisition unit 202 acquires information on the receiving amount of recycled resins in the manufacturing entity of resin products. The receiving amount of the recycled resins indicates the receiving amount of the recycled resins as raw materials for manufacturing the resin products by the manufacturing entity. When the manufacturing entity is a company as described above, the receiving amount indicates, for example, the receiving amount of the recycled resins by the company. When the manufacturing entity is a manufacturing apparatus, the receiving amount indicates, for example, the use amount of the recycled resins by the manufacturing apparatus.

The receiving information acquisition unit 202 may acquire information on a receiving amount transmitted from an apparatus (for example, a terminal apparatus 10) outside the blockchain network 20 or may acquire information on a receiving amount stored in advance in the storage unit 212 of at least a part of the plurality of node apparatuses 200 in the blockchain network 20. The receiving information acquisition unit 202 may acquire "supply information" in a second embodiment and process the same as information on a receiving amount.

For example, a responsible person of a recycling company may operate a terminal apparatus 10 to input the amount of collected used resin products as the receiving amount of recycled resins for manufacturing recycled pellets. A responsible person of a resin maker may operate a terminal apparatus 10 to input the amount of the recycled pellets delivered from the recycling company as the receiving amount of recycled resins for manufacturing compounds. A responsible person of a container manufacturing company may operate a terminal apparatus 10 to input the amount of the compounds delivered from the resin maker as the receiving amount of recycled resins for manufacturing container molding bodies. The information on the receiving amounts input via the terminal apparatuses 10 by the responsible persons of the respective companies as described above is transmitted to the blockchain network 20 and acquired by the receiving information acquisition unit 202.

The information on the recycled resins acquired by the receiving information acquisition unit 202 may include identification information on the recycled resins associated with the recycled resins. The identification information on the recycled resins is, for example, information for identifying the recycled resins of a prescribed unit. As the identification information on the recycled resins, one identification information is, for example, associated with one lot of the manufacturing of recycled products. For example, a recycling company may associate one identification information with one lot of the manufacturing of recycled pellets. For example, a resin maker may associate one identification information with one lot of the manufacturing of compounds. The identification information on the recycled resins may be displayed on, for example, the packages or transaction documents of manufactured resin products. In this case, a seal displaying a code image such as a two-dimensional code (for example, a QR Code™) including the identification information and information on the amount of the recycled resins may be pasted on the packages of the resin products. A responsible person of a resin maker who has bought recycled pellets from a recycling company may be enabled to input identification information on recycled resins and the receiving amount of the recycled resins to a terminal apparatus 10 by reading two-dimensional codes displayed on the packages of the recycled pellets.

The Information on the receiving amount of the recycled resins acquired by the receiving information acquisition unit 202 may also be the accumulated receiving amount (or the accumulated delivery amount or the accumulated use amount) of the recycled resins associated with the same identification information. For example, the receiving information acquisition unit 202 may totalize information on receiving amounts acquired at different timings and calculate (acquire) information on the accumulated receiving amount of recycled resins associated with the same identification information.

The sending information acquisition unit 204 acquires information on the sending amount of resin products using recycled resins in a manufacturing entity. When the manufacturing entity is a company, the sending amount of the resin products is, for example, the shipment amount of the resin products using recycled resins by the company as described above. Note that the shipment amount of resin products shipped (transferred) from a first company to a second company may be called a transfer amount. When the manufacturing entity is a manufacturing apparatus, the sending amount is, for example, the manufacturing amount of resin products using recycled resins by the manufacturing apparatus.

The sending information acquisition unit 204 may acquire information on a sending amount transmitted from an apparatus (for example, a terminal apparatus 10) outside the blockchain network 20 or may acquire information on a sending amount stored in advance in at least a part of the storage units 212 of the plurality of node apparatuses 200 in the blockchain network 20.

For example, a responsible person of a recycling company may operate a terminal apparatus 10 to input the amount of recycled pellets shipped by the recycling company as the sending amount of resin products. A responsible person of a resin maker may operate a terminal apparatus 10 to input the amount of compounds shipped by the resin maker as the sending amount of resin products. A responsible person of a container manufacturing company may operate a terminal apparatus 10 to input the amount of container molding bodies shipped by the container manufacturing company as the shipping amount of resin products. The information on the sending amounts input via the terminal apparatuses 10 by the responsible persons of the respective companies as described above is transmitted to the blockchain network 20 and acquired by the sending information acquisition unit 204.

Information on resin products acquired by the sending information acquisition unit 204 may include identification information on recycled resins associated with the recycled resins used in the resin products. For example, when shipping compounds, a responsible person of a resin maker may input the shipment amount of the compounds to terminal apparatuses 10 in association with identification information on recycled resins used in the manufacturing of the compounds and transmit the same to the blockchain network 20. The sending information acquisition unit 204 acquires identification information on recycled resins transmitted from a terminal apparatus 10 and information on the shipment amount of compounds.

The information on the sending amount of the resin products acquired by the sending information acquisition unit 204 may also be the accumulated sending amount (or the accumulated shipment amount, the accumulated transfer amount, or the accumulated manufacturing amount) of the resin products using the recycled resins associated with the same identification information. For example, the sending information acquisition unit 204 may totalize information on sending amounts acquired at different timings and calculate (acquire) information on the accumulated receiving amount of resin products associated with the same identification information.

The manufacturing information acquisition unit 206 acquires information on the manufacturing of resin products by a manufacturing entity. The information on the manufacturing of the resin products includes, for example, information on a recycling ratio, information on a stock amount after manufacturing, or information on a discard amount. The recycling ratio, the stock amount after manufacturing, and the discard amount are described above.

Like the receiving information acquisition unit 202 or the sending information acquisition unit 204, the manufacturing information acquisition unit 206 may acquire information transmitted from an apparatus (for example, a terminal apparatus 10) outside the blockchain network 20 or may acquire information stored in advance in at least a part of the storage units 212 of the plurality of node apparatuses 200 in the blockchain network 20.

Information on the manufacturing of resin products acquired by the manufacturing information acquisition unit 206 may include identification information on recycled resins associated with the recycled resins used in the resin products.

Further, information on a stock amount after manufacturing and information on a discard amount acquired by the manufacturing information acquisition unit 206 may be a stock amount after manufacturing and a discard amount about recycled resins associated with the same identification information or about resin products using the recycled resins. For example, the manufacturing information acquisition unit 206 may totalize information on stock amounts after manufacturing and discard amounts acquired at different timings and acquire information on a stock amount after manufacturing and a discard amount with respect to the same identification information.

The blockchain network 20 may have a resin product information database that stores information acquired from the receiving information acquisition unit 202, the sending information acquisition unit 204, and the manufacturing information acquisition unit 206.

As shown in FIG. 5D, the resin product information database may include, for example, information such as resin product IDs, stock amounts after manufacturing of resin products, discard amounts, recycling ratios, recycled resin IDs used in the resin products, authentication information on the recycled resins, the use amounts of the recycled resins, additive types, and additive amounts. The data shown in FIG. 5D is expressed in a table form but stored according to a blockchain technology. When authentication is given on the basis of the resin product information database, processing is simplified.

The authentication unit 208 gives authentication to resin products when authentication conditions based on the information on the sending amount and the receiving amount are satisfied. The authentication unit 208 gives authentication to resin products on the basis of, for example, information on the receiving amount of recycled resins acquired by the receiving information acquisition unit 202 and information on the sending amount of the resin products using the recycled resins acquired by the sending information acquisition unit 204 about the resin products to be authenticated. Further, the authentication unit 208 may give authentication to resin products on the basis of information on the manufacturing of the resin products by a manufacturing entity acquired by the manufacturing information acquisition unit 206 about the resin products to be authenticated. The authentication unit 208 generates authentication information showing that resin products authenticated as recycled products are the recycled products. Hereinafter, an example of conditions on which resin products are authenticated as recycled products will be shown. Values used in the following conditions are values shown by information acquired by the receiving information acquisition unit 202, the sending information acquisition unit 204, or the manufacturing information acquisition unit 206. In order to authenticate resin products as recycled products, one of the following conditions may be independently used, or two or more of the conditions may be used.

(1) Conditions on which Mode of Manufacturing Entity is not Specified

A manufacturing entity can include a mode of a company, a manufacturing apparatus, or another entity, but authentication conditions applicable without specifying any mode will be shown below. In the case of (Condition 1-1), a sending amount may be determined on the basis of the weight of recycled resins in resin products or may be determined by the mass balance approach described above. When the mass balance approach is employed, the sending amount of recycling-authenticated resin products is assumed as the sending amount of resin products. In the case of (Condition 1-2), the weight of resin products themselves is assumed as the sending amount of the resin products and multiplied by a recycling ratio to determine compatibility with the receiving amount of recycled resins.

(Condition 1-1)

The sending amount of resin products shown by information acquired by the sending information acquisition unit 204 does not exceed the receiving amount of recycled resins shown by information acquired by the receiving information acquisition unit 202.

(Condition 1-2)

A receiving amount, a sending amount, and a recycling ratio shown by information acquired by the receiving information acquisition unit 202, the sending information acquisition unit 204, and the manufacturing information acquisition unit 206, respectively, satisfy the following relational expression (A1).

$$\text{the receiving amount} \geq \text{the sending amount} \times \text{the recycling ratio} \quad \text{Relational expression (A1):}$$

(2) Conditions where Manufacturing Entity is Company

Authentication conditions applicable when the receiving amount is the delivery amount of recycled resins and the sending amount is the shipment amount of resin products using the recycled resins where a manufacturing entity is a company will be shown below. In the case of the following (Condition 2-2) and (Condition 2-4), a sending amount may be determined on the basis of the weight of recycled resins in resin products or may be determined by the mass balance approach described above.

(Condition 2-1)

The following relational expression (A2) is satisfied.

$$\text{the delivery amount} \geq \text{the shipment amount} \times \text{the recycling ratio} \quad \text{Relational expression (A2):}$$

(Condition 2-2)

The delivery amount, the shipment amount, and a stock amount after manufacturing shown by information acquired by the manufacturing information acquisition unit 206 satisfy the following relational expression (A3).

$$\text{the delivery amount} \geq \text{the shipment amount} + \text{the stock amount after manufacturing} \quad \text{Relational expression (A3):}$$

(Condition 2-3)

The delivery amount, the shipment amount, the stock amount after manufacturing, and the recycling ratio satisfy the following relational expression (A3-1).

$$\text{the delivery amount} \geq (\text{the shipment amount} + \text{the stock amount after manufacturing}) \times \text{the recycling ratio} \quad \text{Relational expression (A3-1):}$$

(Condition 2-4)

The delivery amount, the shipment amount, and a discard amount shown by information acquired by the manufacturing information acquisition unit 206 satisfy the following relational expression (A4).

$$\text{the delivery amount} \geq \text{the shipment amount} + \text{the discard amount} \quad \text{Relational expression (A4):}$$

(Condition 2-5)

The delivery amount, the shipment amount, the discard amount, and the recycling ratio satisfy the following relational expression (A4-1).

$$\text{the delivery amount} \geq (\text{the shipment amount} + \text{the discard amount}) \times \text{the recycling ratio} \quad \text{Relational expression (A4-1):}$$

(Condition 2-6)

Among sending amounts shown by information acquired by the sending information acquisition unit 204, the shipment amount of recycled resins shipped (transferred) from a first company (for example, a recycling company) to a second company (for example, a resin maker) is assumed as a first transfer amount. Further, among receiving amounts shown by information acquired by the receiving information acquisition unit 202, the delivery amount of recycled resins delivered from the first company to the second company is assumed as a first delivery amount. At this time, the first delivery amount does not exceed the first transfer amount.

(3) Conditions where Manufacturing Entity is Manufacturing Apparatus

Authentication conditions applicable when the receiving amount shown by information acquired by the receiving information acquisition unit 202 is the use amount of recycled resins and the sending amount shown by information acquired by the sending information acquisition unit 204 is the manufacturing amount of resin products using the recycled resins where a manufacturing entity is a manufacturing apparatus will be shown below. In the case of the following (Condition 3-2), the sending amount may be determined on the basis of the weight of the recycled resins in the resin products or may be determined by the mass balance approach described above.

(Condition 3-1)

The use amount, the manufacturing amount, and a recycling ratio shown by information acquired by the manufacturing information acquisition unit 206 satisfy the following relational expression (B1).

$$\text{the use amount} \geq \text{the manufacturing amount} \times \text{the recycling ratio} \quad \text{Relational expression (B1):}$$

(Condition 3-2)

The use amount, the manufacturing amount, and a discard amount shown by information acquired by the manufacturing information acquisition unit 206 satisfy the following relational expression (B2).

$$\text{the use amount} \geq \text{the manufacturing amount} + \text{the discard amount} \quad \text{Relational expression (B2):}$$

(Condition 3-3)

The use amount, the manufacturing amount, the discard amount, and a recycling ratio shown by information acquired by the manufacturing information acquisition unit 206 satisfy the following relational expression (B2-1).

$$\text{the use amount} \geq (\text{the manufacturing amount} + \text{the discard amount}) \times \text{the recycling ratio} \quad \text{Relational expression (B2-1):}$$

(Condition 3-4)

Among sending amounts shown by information acquired by the sending information acquisition unit 204, the shipment amount of recycled resins shipped (transferred) from a first company to a second company is assumed as a second transfer amount. Further, among receiving amounts shown by information acquired by the receiving information acquisition unit 202, the use amount of recycled resins delivered from the first company to the second company and used in manufacturing is assumed as a second use amount. At this time, the second use amount does not exceed the second transfer amount.

(4) Conditions where Manufacturing Entity is Company and Manufacturing Apparatus Conditions applicable when the receiving amount is the delivery amount of recycled resins and the use amount of the recycled resins and the sending amount is the shipment amount of resin products using the recycled resins where a manufacturing entity is a company and a manufacturing apparatus will be shown below. In the case of the following (Condition 4-1) and (Condition 4-2), the sending amount may be determined on the basis of the weight of the recycled resins in the resin products or may be determined by the mass balance approach described above.

(Condition 4-1)

The delivery amount and the use amount satisfy the following relational expression (C1).

$$\text{the delivery amount} \geq \text{the use amount} \quad \text{Relational expression (C1):}$$

(Condition 4-2)

The delivery amount and the accumulated use amount satisfy the following relational expression (C'1).

$$\text{the delivery amount} \geq \text{the accumulated use amount} \quad \text{Relational expression (C'1):}$$

(Condition 4-3)

The use amount, the shipment amount, the stock amount after manufacturing, the discard amount, and the recycling ratio satisfy the following relational expression (C2).

(the shipment amount+the stock amount after manufacturing+the discard amount)×the recycling ratio≥the use amount    Relational expression (C2):

(Condition 4-4)

When the authentication unit 208 authenticates resin products using two or more recycled resins to which different identification numbers are assigned, all the recycled resins satisfy Condition 4-1 or Condition 4-2 described above and the use amount, the shipment amount, the stock amount after manufacturing, the discard amount, and the recycling ratio satisfy the following relational expression (C3).

(the shipment amount+the stock amount after manufacturing+the discard amount)×the recycling ratio≥the total use amount of all the recycled resins    Relational expression (C3):

The consensus building processing unit 210 transmits target data to another node apparatus 200 to be shared and performs prescribed consensus building processing. As a consensus building algorithm in the consensus building processing, an arbitrary algorithm in a blockchain such as PBFT and Endorsement-Ordering-Validation is employable. The consensus building processing unit 210 verifies the validity of target data in the consensus building processing. When a consensus is built in the consensus building processing by the consensus building processing unit 210, target data is transmitted to another node apparatus 200 and stored in the respective storage units 212 of the own machine and the other node apparatus 200. As a result, the consensus data is shared and separately stored in the plurality of node apparatuses 200.

For example, when a consensus is built after the consensus building processing unit 210 performs consensus building processing on information acquired by the receiving information acquisition unit 202, the sending information acquisition unit 204, and the manufacturing information acquisition unit 206, the consensus building processing unit 210 may perform control to store the information in the storage units 212 of the own machine and another node apparatus 200. Further, when a consensus is built after the consensus building processing unit 210 performs consensus building processing on authentication information generated by the authentication unit 208, the consensus building processing unit 210 may perform control to store the information in the storage units 212 of the own machine and another node apparatus 200.

The storage unit 212 stores data for which a consensus has been built by the consensus building processing unit 210. The storage unit 212 stores, for example, information for which a consensus has been built among information acquired by the receiving information acquisition unit 202, the sending information acquisition unit 204, and the manufacturing information acquisition unit 206 and authentication information generated by the authentication unit 208.

<Processing Flow>

An example of a processing flow performed by the blockchain network 20 will be described with reference to FIG. 6. The processing is realized when the processor 101 of a node apparatus 200 reads and runs a computer program stored in the storage device 105. Note that the detailed descriptions of processing steps that have been described in detail above among respective processing steps in the processing will be omitted here.

First, in step S101, the processor 101 acquires information on the receiving amount of recycled resins in a manufacturing entity about target resin products. The information on the receiving amount is acquired from the storage device 105 in which the information is stored in advance or information received from the terminal apparatus 10. Information acquired in the following steps is also similarly acquired.

In step S102, the processor 101 acquires information on the sending amount of resin products using the recycled resins in a manufacturing entity about the target resin products.

In step S103, the processor 101 determines whether the target resin products satisfy authentication conditions on the basis of the information on the receiving amount and the sending amount acquired in steps S101 and S102.

Figure 6:
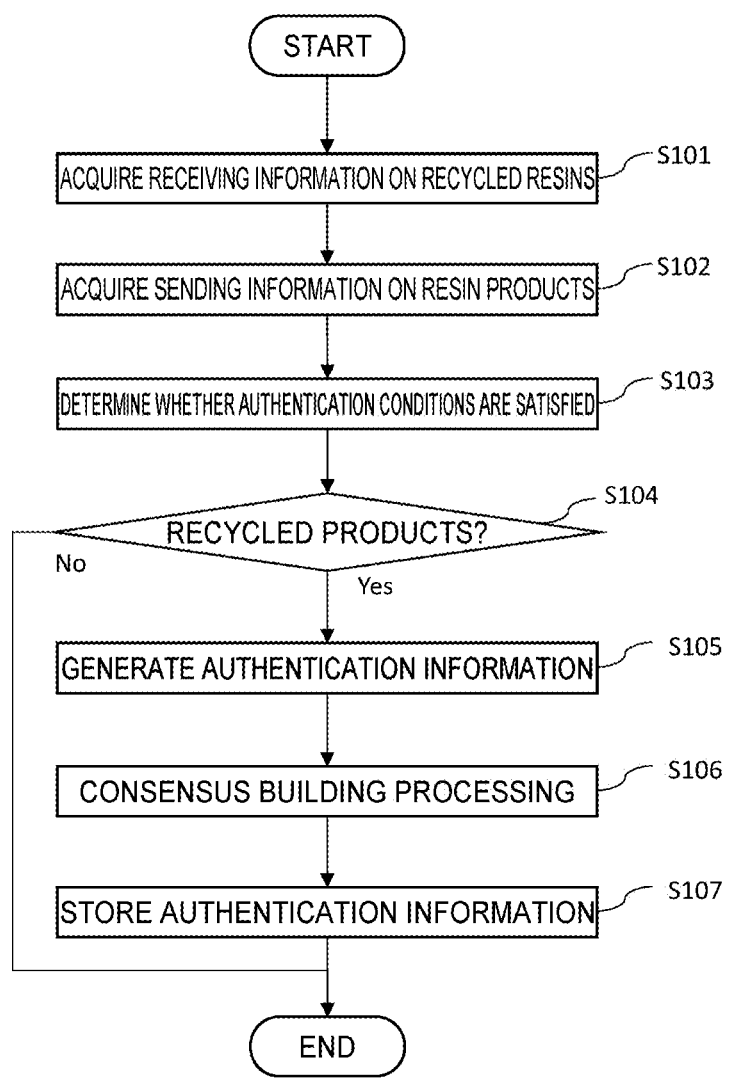
FIG. 6 is a flowchart showing an example of a processing flow according to the first embodiment.

The processing shown in FIG. 6 ends when it is determined in step S103 that the authentication conditions are not satisfied (No in step S104), and proceeds to step S105 when it is determined that the authentication conditions are satisfied (Yes in step S104).

In step S105, the processor 101 authenticates the target resin products as recycled products and generates authentication information showing that the target resin products are the recycled products.

In step S106, the processor 101 performs consensus building processing for the authentication information generated in step S105. The contents of the consensus building processing are described above.

In step S107, the processor 101 stores the authentication information for which the consensus has been built in the consensus building processing of step S106 in the storage device 105, and ends the processing shown in FIG. 6.

Modified Examples

A program for implementing the information processing system 1 (or the terminal apparatuses 10, the blockchain network 20, and the node apparatuses 200) in the present embodiment can be installed or loaded into a computer via various recording media such as an optical disk, a magnetic disk, and a semiconductor memory or by being downloaded via a communication network or the like.

Further, the blockchain network 20 in the present embodiment may be replaced by another configuration such as a server apparatus, cloud computing, and edge computing that stores data and performs processing. In this case, the server apparatus, the cloud computing, or the edge computing (hereinafter called "the server apparatus or the like") has configurations like the receiving information acquisition unit 202, the sending information acquisition unit 204, the manufacturing information acquisition unit 206, the authentication unit 208, and the storage unit 212 shown in FIG. 5A. Note that information for which a consensus has been built by the consensus building processing unit 210 is stored in the storage unit 212 in the present embodiment, but information for which a consensus has not been built is stored in the storage unit 212 in the present modified example.

2. Second Embodiment

In the present embodiment, a blockchain network 20 determines whether recycled resins are used in target resin products on the basis of information on the supply chain of the target resin products. When authentication conditions including a condition that the recycled resins are used are satisfied, authentication is given to the target resin products.

According to the present embodiment, target resin products can be authenticated as recycled products on the basis of information on the supply chain of the target resin products.

The contents of the present embodiment that will be described below are appropriately applicable to other respective embodiments. In the present embodiment, the same configurations as those of the first embodiment will be appropriately denoted by the same symbols, and their descriptions will be omitted or simplified.

<Function Configurations>

Figure 7:
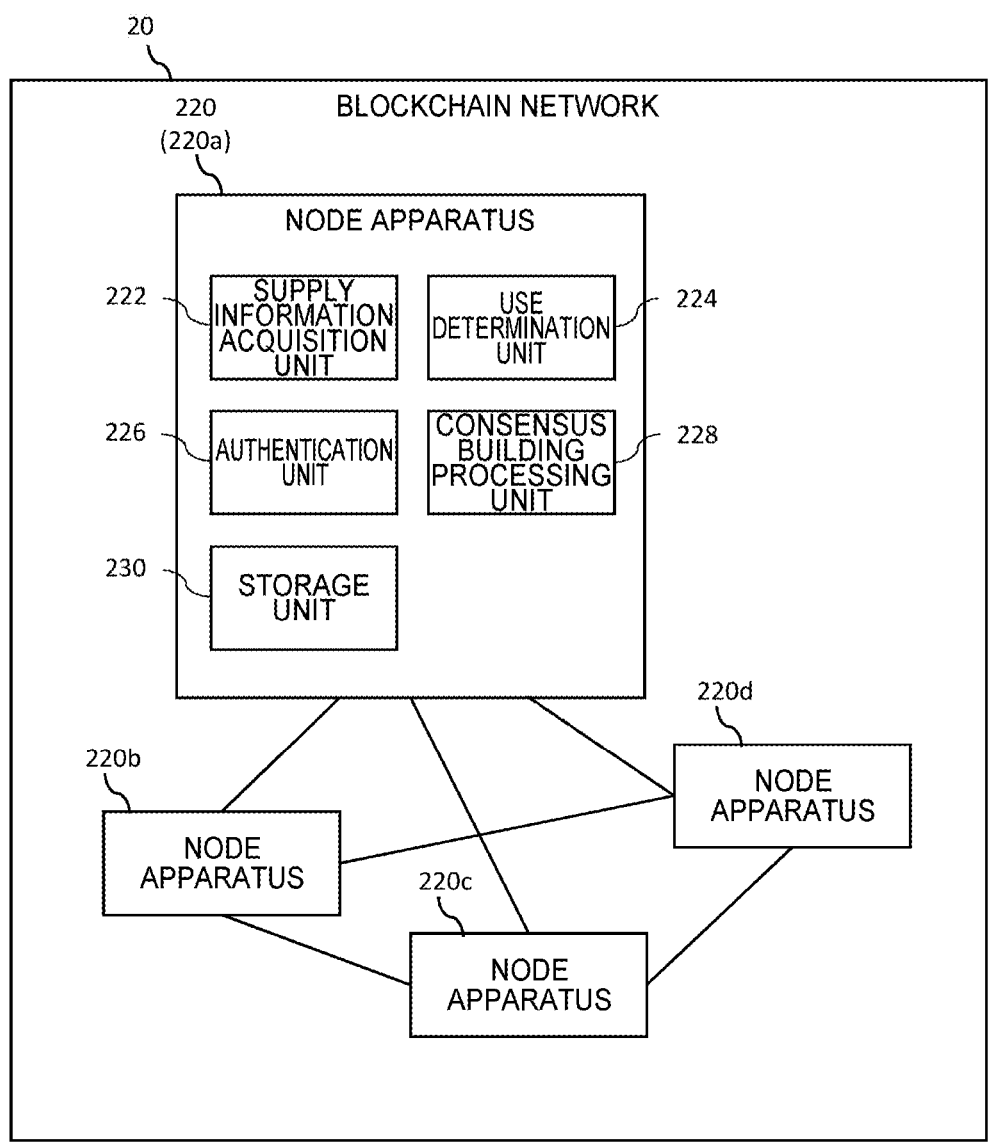
FIG. 7 is a block diagram showing an example of the function configurations of a blockchain network according to a second embodiment.

An example of the functions of the blockchain network 20 in the present embodiment will be described with reference to FIG. 7. The blockchain network 20 in the present embodiment is configured to include node apparatuses 220*a*, 220*b*, 220*c*, and 220*d*. Each of the node apparatuses 220*a*, 220*b*, 220*c*, and 220*d* has the same configurations. In the present embodiment, the node apparatuses 220*a*, 220*b*, 220*c*, and 220*d* are, when referred to without being distinguished from each other, generically called node apparatuses 220. In the example shown in FIG. 7, the respective node apparatuses 220 in the blockchain network 20 include a supply information acquisition unit 222, a use determination unit 224, an authentication unit 226, a consensus building processing unit 228, and a storage unit 230 as main function configurations. These functions are realized when a control unit (processor 101) possessed by the respective node apparatuses 220 reads and runs a computer program stored in a storage device 105.

The supply information acquisition unit 222 acquires supply information showing information on the supply chain of resin products. The supply chain of the resin products indicates a series of processes including the procurement of raw materials, manufacturing, stock management, physical distribution, and sales about the resin products. Particularly in the present embodiment, the supply chain of the resin products indicates a series of processes performed when collected used resin products are procured by a recycling company and then resins are supplied to a resin maker, a container manufacturing company, a maker, and general consumers as shown in FIG. 3.

The supply information showing the information on the supply chain of the resin products includes, for example, information on resin products manufactured by respective companies such as a recycling company, a resin maker, and a container manufacturing company as shown in FIG. 3. Specifically, the supply information showing the information on the supply chain of the resin products may include, about the resin products manufactured by the above respective companies, information such as identification information on the resin products, identification information on raw material resins, the authentication or non-authentication of the resin products as recycled products, company names that have manufactured the resin products, the recycling ratios of the resin products, satisfied authentication conditions, and the compositions of recycled resins.

The identification information on the resin products is, for example, information for identifying the resin products of a prescribed unit. For example, one identification information is associated with one lot of the manufacturing of resin products.

The identification information on the raw material resins (identification information on recycled resins where resin products are recycled pellets, the same applies hereinafter) is, for example, information for identifying the raw material resins of a prescribed unit. For example, one identification information is associated with one lot of the manufacturing of raw material resins. The identification information on the raw material resins may be displayed on, for example, the packages or transaction documents of manufactured resin products. In this case, a seal displaying a code image such as a two-dimensional code including the identification information and other supply information may be pasted on the packages of the resin products. For example, a responsible person of a resin maker who has bought recycled pellets from a recycling company may be enabled to input supply information including identification information on material resins to a terminal apparatus 10 by reading a two-dimensional code or the like displayed on the packages of the recycled pellets.

The authentication or non-authentication of the resin products as recycled products indicates information showing whether target resin products are authenticated by an authentication method that will be described later in the present embodiment, authentication methods described in other embodiments, or other methods such as authentication by a third party organization.

The satisfied authentication conditions indicate information that, when target resin products are authenticated as recycled products, shows authentication conditions satisfied in the authentication. The authentication conditions include authentication conditions that will be described later in the present embodiment, authentication conditions described in other embodiments (for example, the authentication conditions shown in the description of the authentication unit 208 in the first embodiment), or other authentication conditions.

The composition of recycled resins indicates information showing the composition of recycled resins included in target resin products. The composition of recycled resins is shown by, for example, the name of the recycled resins included in target resin products and the proportion of the included recycled resins.

The supply information acquisition unit 222 is able to acquire supply information showing information on the supply chain of resin products from an arbitrary place. The supply information acquisition unit 222 may acquire the supply information from an apparatus (for example, a terminal apparatus 10) outside the blockchain network 20 or may acquire the above supply information stored in advance in at least a part of storage units 230 of the plurality of node apparatuses 220 in the blockchain network 20. When the supply information is acquired from the storage units 230 of the blockchain network 20, it is possible to acquire information of which the reliability is secured by a blockchain technology. Further, when the supply information is acquired from the terminal apparatuses 10, it is also possible to acquire information of which the reliability is further secured by the acquisition of information obtained by performing the scanning or the like of transaction documents serving as the source of the supply information.

The supply information showing information on the supply chain of resin products acquired by the supply information acquisition unit 222 may include identification information on raw material resins associated with raw material resins used in the resin products. The identification information on the raw material resins is, for example, information for identifying the raw material resins of a prescribed unit. For example, one identification information is associated with one lot of the manufacturing of raw material resins. The identification information on the raw material resins may be displayed on, for example, the packages of manufactured resin products. In this case, a seal displaying a code image such as a two-dimensional code including the identification information and the amount of the raw material resins may be pasted on the packages of the resin products. For example, a responsible person of a resin maker who has bought pellets from a recycling company may be enabled to input supply information including identification information on recycled resin to a terminal apparatus 10 by reading a two-dimensional code or the like displayed on the packages of the pellets.

The use determination unit 224 determines whether recycled resins are used in resin products on the basis of supply information acquired by the supply information acquisition unit 222. For example, when the supply information includes information showing the use of recycled resins or information suggesting the use of the recycled resins, the use determination unit 224 may determine that the recycled resins are used in resin products. Since the use determination unit 224 determines whether recycled resins are used in resin products on the basis of highly-reliable supply information acquired by the supply information acquisition unit 222, it is possible to make a highly-reliable determination.

Further, the use determination unit 224 may determine whether authentication by a third party organization on the raw material resins of resin products has been obtained on the basis of supply information acquired by the supply information acquisition unit 222. The authentication by a third party organization on the raw material resins of resin products indicates authentication by a third party organization to show that the raw material resins are recycled resins. For example, raw material resins manufactured by a company authenticated by a third party organization may be regarded as being authenticated by the third party organization. When supply information on product resins includes information on the obtaining of authentication by a third party organization showing that the raw material resins are recycled resins, the use determination unit 224 may determine that authentication by the third party organization on the raw material resins of the resin products is obtained. When determining that the authentication by the third party organization is obtained on the basis of supply information, the use determination unit 224 may determine that recycled resins are used in resin products.

The authentication unit 226 gives authentication to resin products when it is determined by the use determination unit 224 that authentication conditions including the use of recycled resins are satisfied. That is, the authentication unit 226 authenticates target resin products as recycled products on the basis of a highly-reliable determination result by the use determination unit 224. The authentication unit 226 generates authentication information showing that resin products authenticated as recycled products are the recycled products.

Further, the authentication conditions may include, on the basis of supply information acquired by the supply information acquisition unit 222, the obtaining of authentication by a third party organization on at least one raw material resin in the supply chain of resin products and may include the obtaining of the authentication by the third party organization for recycled resins manufactured from collected used resin products. The authentication by the third party organization on the raw material resins indicates authentication by a third party organization to show that the raw material resins are recycled resins. Note that recycled pellets manufactured from used resin products collected by a recycling company authenticated by a third party organization may be designated as raw material resins authenticated by the third party organization.

The consensus building processing unit 228 transmits target data to another node apparatus 220 to be shared and performs prescribed consensus building processing. As a consensus building algorithm in the consensus building processing, an arbitrary algorithm in a blockchain such as PBFT and Endorsement-Ordering-Validation is employable. The consensus building processing unit 228 verifies the validity of target data in the consensus building processing. When a consensus is built in the consensus building processing by the consensus building processing unit 228, target data is transmitted to another node apparatus 220 and stored in the respective storage units 230 of the own machine and the other node apparatus 220. As a result, the consensus data is shared and separately stored in the plurality of node apparatuses 220.

For example, when a consensus is built after the consensus building processing unit 228 performs consensus building processing on information acquired by the supply information acquisition unit 222 and authentication information generated by the authentication unit 226, the consensus building processing unit 228 may perform control to store the information in the storage units 230 of the own machine and another node apparatus 220.

The storage unit 230 stores data for which a consensus has been built by the consensus building processing unit 228. The storage unit 230 stores, for example, information for which a consensus has been built among the above supply information acquired by the supply information acquisition unit 222 and authentication information generated by the authentication unit 226.

The supply information showing information on the supply chain of resin products may be, every time recycled resins or resin products are traded or transferred between the companies shown in FIG. 3, stored in the storage unit 230 according to input to terminal apparatuses 10 by the companies. Further, the supply information is stored in the storage unit 230 so that the supply chain of resin products is traceable. For example, the supply information is stored in the storage unit 230 so that the trade or transfer of recycled resins or resin products between the companies is traceable by identification information on the recycled resins. In this case, the supply information acquisition unit 222 is able to acquire the supply information that is information on the supply chain of the resin products using the recycled resins associated with the same identification information from the storage unit 230. The supply information acquired from the storage unit 230 by the supply information acquisition unit 222 may be transmitted to and displayed on the terminal apparatuses 10.

Figure 8:
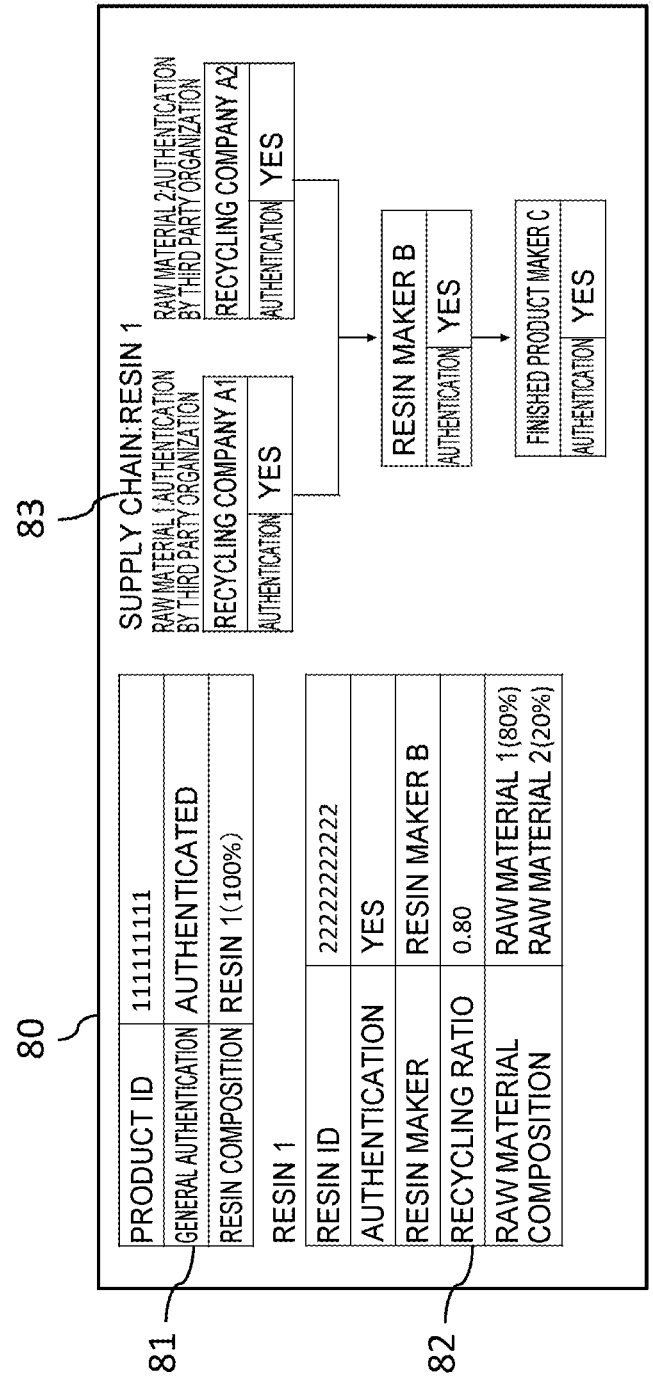
FIG. 8 is a conceptual diagram showing an example of an image displayed on a terminal apparatus according to the second embodiment.

An example of supply information showing information on the supply chain of resin products displayed on a terminal apparatus 10 will be described with reference to FIG. 8. An image 80 shown in FIG. 8 is an image showing supply information displayed on the display device of the terminal apparatus 10. The image 80 shows resin product information 81, raw material resin information 82, and supply chain information 83.

The resin product information 81 includes information on a product ID (identification information on a resin product), general authentication (showing whether the resin product is authenticated), and a resin composition (the composition of the resin product). The raw material resin information 82 is information on a raw material resin shown by the resin composition included in the resin product information 81.

The raw material resin information 82 may include a resin ID (identification information on the raw material resin), authentication (information showing whether the raw material resin is authenticated), a resin maker (the maker of the raw material resin), a recycling ratio (the ratio of a recycled resin included in the raw material resin), the authentication conditions of a recycled product satisfied by the raw material resin, information on the composition of a recycled pellet of the raw material resin, and authentication by a third party organization (information showing whether the recycled pellet is authenticated by the third party organization). The supply chain information 83 shows the supply chain of the resin product (resin 1). The supply chain information 83 shows that a resin maker B has manufactured the resin product using raw material resins delivered from recycling companies A1 and A2 and has shipped the resin product to a finished product maker C. The supply chain information 83 may also show authentication situations in respective supply chains.

In order to refer to a screen like one as shown in FIG. 8, users may be enabled to acquire an address to access the above supply information by reading a code such as a two-dimensional code displayed on resin products or the packages of the resin products via the cameras (not shown) of the terminal apparatuses 10 or the like.

Since information on the supply chain of resin products is confirmable via the terminal apparatuses 10 according to the present embodiment, the users are enabled to easily confirm whether the resin products are recycled products and confirm information on recycled resins.

<Processing Flow>

An example of a processing flow performed by the blockchain network 20 according to the present embodiment will be described with reference to FIG. 9. The processing is realized when the processor 101 of a node apparatus 220 reads and runs a computer program stored in the storage device 105. Note that the detailed descriptions of processing steps that have been described in detail above among respective processing steps in the processing will be omitted here.

First, in step S201, the processor 101 acquires supply information showing information on the supply chain of target resin products. The supply information is acquired from the storage device 105 in which the information is stored in advance or information received from the terminal apparatus 10.

In step S202, the processor 101 determines whether recycled resins are used in the target resin products on the basis of the supply information acquired in step S201. For example, when the supply information includes information showing the use of the recycled resins or information suggesting the use of the recycled resins, the processor 101 determines that the recycled resins are used in the resin products.

The processing proceeds to step S204 when it is determined in step S202 that the recycled resins are used (Yes in step S203). Otherwise, the processing shown in FIG. 9 ends.

In step S204, the processor 101 authenticates the target resin products as recycled products and generates authentication information showing that the target resin products are recycled products.

In step S205, the processor 101 performs consensus building processing for the authentication information generated in step S204. The contents of the consensus building processing are described above.

Figure 9:
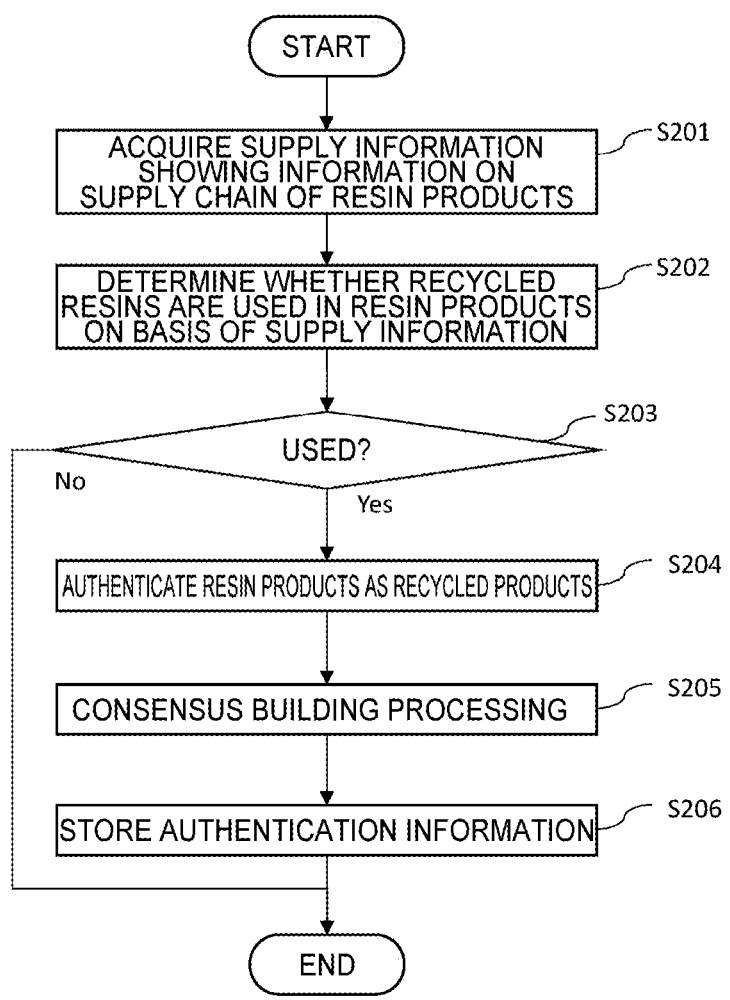
FIG. 9 is a flowchart showing an example of a processing flow according to the second embodiment.

In step S206, the processor 101 stores the authentication information for which the consensus has been built in the consensus building processing of step S205 in the storage device 105, and ends the processing shown in FIG. 9.

Modified Examples

A program for implementing the information processing system 1 (or the terminal apparatuses 10, the blockchain network 20, and the node apparatuses 220) in the present embodiment can be installed or loaded into a computer via various recording media such as an optical disk, a magnetic disk, and a semiconductor memory or by being downloaded via a communication network or the like.

Further, the blockchain network 20 in the present embodiment may be replaced by another configuration such as a server apparatus, cloud computing, and edge computing that stores data and performs processing. In this case, the server apparatus, the cloud computing, or the edge computing (hereinafter called "the server apparatus or the like") has configurations like the supply information acquisition unit 222, the use determination unit 224, the authentication unit 226, and the storage unit 230 shown in FIG. 7. Note that information for which a consensus has been built by the consensus building processing unit 228 is stored in the storage unit 230 in the present embodiment, but information for which a consensus has not been built is stored in the storage unit 230 in the present modified example.

3. Third Embodiment

In the present embodiment, a blockchain network 20 makes a determination as to the transaction of at least resin products or resins including recycled resins (hereinafter, the resin products or the raw material resins will also be called "resins") in a supply chain to which a plurality of companies participate. More specifically, shipment information on resins shipped by a first company (for example, information including at least a part of identification information on the resins, shipment destination information on the resins, shipment amount information on the resins, and shipment timing information on the resins) is received from the first company, and delivery information on the resins delivered to a second company is received from the second company. On the basis of the above shipment information and the above delivery information, a determination as to the validity of transaction is made.

According to the present embodiment, it is possible to make a determination with higher reliability since the validity of transaction is determined on the basis of information from a plurality of companies. As a result, it is possible to prevent the reception of false information on transactions from companies.

The contents of the present embodiment that will be described below are appropriately applicable to other respective embodiments. In the present embodiment, the same configurations as those of other embodiments will be appropriately denoted by the same symbols, and their descriptions will be omitted or simplified.

<Function Configurations>

Figure 10:
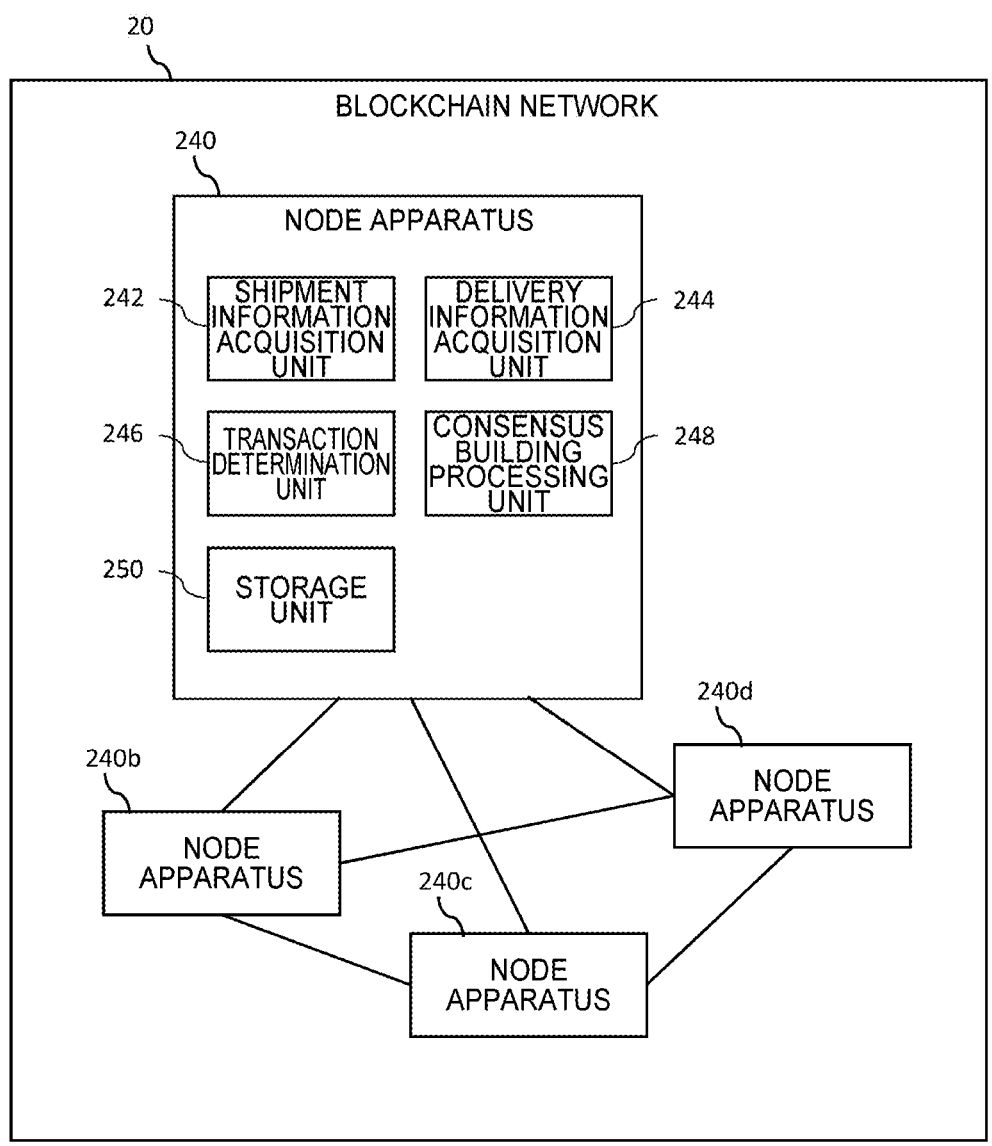
FIG. 10 is a block diagram showing an example of the function configurations of a blockchain network according to a third embodiment.

An example of the functions of the blockchain network 20 in the present embodiment will be described with reference to FIG. 10. The blockchain network 20 in the present embodiment is configured to include node apparatuses 240a, 240b, 240c, and 240d. Each of the node apparatuses 240a, 240b, 240c, and 240d has the same configurations. In the present embodiment, the node apparatuses 240a, 240b, 240c, and 240d are, when referred to without being distinguished from each other, generically called node apparatuses 240. In the example shown in FIG. 10, the respective node apparatuses 240 in the blockchain network 20 include a shipment information acquisition unit 242, a delivery information acquisition unit 244, a transaction determination unit 246, a consensus building processing unit 248, and a storage unit 250 as main function configurations. These functions are realized when a control unit (processor 101) possessed by the respective node apparatuses 240 reads and runs a computer program stored in a storage device 105.

In a supply chain in which a plurality of companies participate, the shipment information acquisition unit 242 receives, from the first company via a first terminal apparatus, shipment information including at least a part of identification information on resins (including resin products or raw material resins as described above) shipped by the first company, shipment destination information on the resins, shipment amount information on the resins, shipment timing information on the resins, and identification information on a transaction about the shipment of the resins. The shipment information may be stored in the storage unit 250 after being subjected to consensus building processing that will be described later.

In the present embodiment, the supply chain in which a plurality of companies participate indicates a series of processes including the procurement of raw materials, manufacturing, stock management, physical distribution, and sales about resins in which the plurality of companies participate. Particularly in the present embodiment, the supply chain in which a plurality of companies participate indicates a series of processes performed when collected used resin products are procured by a recycling company and then resins are supplied to a resin maker, a container manufacturing company, a maker, and general consumers as shown in FIG. 3.

In the present embodiment, the resins shipped by the first company indicate, for example, resins (for example, pellets) shipped to another company (for example, the resin maker) by any of the plurality of companies (for example, the recycling company) shown in FIG. 3.

The first terminal apparatus indicates a terminal apparatus 10 (for example, a terminal apparatus 10a) usable by a responsible person of the first company. For example, the responsible person of the first company operates the terminal apparatus 10a to input shipment information including identification information on target resins shipped by the first company, shipment destination information on the resins (for example, information for identifying a shipment destination company), shipment amount information on the resins, or shipment timing information on the resins (for example, dates and times at which the resins were shipped) and transmit the shipment information to the blockchain network 20. As an example of a method for inputting the shipment information, the responsible person of the first company may be enabled to input the shipment information to the terminal apparatus 10a by reading, using the terminal apparatus 10a, an image code such as a two-dimensional code displayed on the packages or transaction documents of the shipped resins. Alternatively, shipment information stored in the storage unit of the terminal apparatus 10a may be transmitted to the blockchain network 20 according to the operation of the responsible person of the first company. The shipment information transmitted to the blockchain network 20 is acquired by the shipment information acquisition unit 242.

The delivery information acquisition unit 244 receives, from the second company via a second terminal apparatus, the delivery information on the resins delivered to the second company. The delivery information may be stored in the storage unit 250 after being subjected to consensus building processing that will be described later. The resins delivered to the second company indicate, for example, resins (for example, recycled pellets) delivered from another company (for example, a recycling company) to a company (for example, a resin maker) different from the first company among the plurality of companies shown in FIG. 3.

The second terminal apparatus indicates a terminal apparatus 10 (for example, a terminal apparatus 10b) usable by a responsible person of the second company. For example, the responsible person of the second company operates the terminal apparatus 10b to input delivery information on resins delivered to the second company.

The delivery information on the resins delivered to the second company is, for example, information including at least a part of identification information on the resins delivered to the second company, shipment source information on the resins (information on a company that has shipped the resins delivered to the second company), delivery amount information on the resins, delivery timing information on the resins, and identification information on a transaction about the delivery of the resins. Since the information is information corresponding to shipment information acquired by the shipment information acquisition unit 242, the information will also be called "corresponding information" in the following description. For example, the responsible person of the second company operates the terminal apparatus 10b to input the above corresponding information on the target resins delivered to the second company as delivery information and transmit the delivery information to the blockchain network 20. As an example of a method for inputting the corresponding information, the responsible person of the first company may input the corresponding information to the terminal apparatus 10b as delivery information by reading, using the terminal apparatus 10b, an image code such as a two-dimensional code displayed on the packages or the like of the delivered resins. The delivery information transmitted to the blockchain network 20 is received by the delivery information acquisition unit 244.

Further, the delivery information on the resins delivered to the second company includes, as another example, information showing whether shipment information on the first company acquired by the shipment information acquisition unit 242 is approved. The information will also be called "approval information" in the following description. For example, according to the operation of the responsible person of the second company, the terminal apparatus 10b receives the shipment information on the first company acquired by the delivery information acquisition unit 244 from the blockchain network 20 and displays the same on its display unit. The responsible person of the second company confirms the shipment information displayed on the display unit, determines whether the shipment information is valid in comparison with the delivery information delivered to the second company, and transmits approval information showing whether the shipment information is approved to the blockchain network 20 via the terminal apparatus 10b. The approval information transmitted to the blockchain network 20 is received by the delivery information acquisition unit 244 as delivery information.

When the delivery information on the second company received by the delivery information acquisition unit 244 shows that the shipment information on the first company is not approved, the blockchain network 20 notifies the first company of the fact via the terminal apparatus 10. The first company is able to correct the shipment information on the first company and transmit the corrected shipment information to the blockchain network 20 according to the notification. The corrected shipment information is acquired by the shipment information acquisition unit 242.

The transaction determination unit 246 makes a transaction determination that is a determination as to the validity of a transaction on the basis of shipment information received from a first company by the shipment information acquisition unit 242 and delivery information received from a second company by the delivery information acquisition unit 244. The determination as to the validity of a transaction includes, for example, a determination as to whether shipment information and delivery information match (or correspond) to each other or a determination as to whether a transaction actually occurs. Further, the transaction determination unit 246 generates transaction validity information showing the result of a transaction determination. Shipment information and delivery information used in making a transaction determination may be acquired from the storage unit 250 in which the shipment information and the delivery information are stored in advance.

When the delivery information acquisition unit 244 receives the above corresponding information as delivery information, the transaction determination unit 246 first determines whether the shipment information received by the shipment information acquisition unit 242 and the delivery information received by the delivery information acquisition unit 244 match to each other. For example, it is assumed that the following information is received as the shipment information and the delivery information.

Shipment Information
- a1: identification information on resins shipped by first company (Identification information on resin products or raw material resins)
- a2: shipment destination information on resins
- a3: shipment amount information on resins
- a4: shipment timing information on resins
- a5: identification information on transaction about shipment of resins Delivery Information
- b1: identification information on resins delivered to second company (identification information on resin products or raw material resins)
- b2: shipment source information on resins (information on company that has shipped resins delivered to second company)
- b3: delivery amount information on resins
- b4: delivery timing information on resins
- b5: identification information on transaction about delivery of resins When a transaction determination about the transaction between the recycling company (first company) and the resin maker (second company) in FIG. 3 is made in this example, the transaction determination unit 246 determines the match between the shipment information a1 to a4 and the delivery information b1 to b4. As a specific example, the transaction determination unit 246 determines the match on the basis of the following determination results. A determination is made as to whether the identification information (a1) on shipped resins and the identification information (b1) on delivered resins correspond to each other. A determination is made as to whether the shipment destination information (a2) and the shipment source information (b2) on resins correspond to each other. A determination is made as to whether the shipment amount information (a3) and the delivery amount information (b3) correspond to each other. A determination is made as to whether the shipment timing information (a4) and the delivery timing information (b4) correspond to each other or their difference falls within an allowable range in consideration of a distribution period or the like. A determination is made as to whether the identification information (a5) on a transaction about shipment and the identification information (b5) on a transaction about delivery correspond to each other. When determining that the shipment information and the delivery information match to each other, the transaction determination unit 246 determines that the transaction is valid.

When the delivery information acquisition unit 244 receives the above approval information as delivery information, the transaction determination unit 246 determines that, if it is indicated that shipment information acquired by the shipment information acquisition unit 242 is approved, a transaction corresponding to the shipment information is valid.

Shipment information and delivery information used in making a determination by the transaction determination unit 246 may not be shipment information and delivery information on companies that perform a direct transaction with each other (for example, shipment information on the recycling company and delivery information on the resin maker in FIG. 3) in a supply chain. The transaction determination unit 246 also makes it possible to determine, using shipment information and delivery information on two companies that do not perform a direct transaction with each other (for example, shipment information on the recycling company and delivery information on the container manufacturing company in FIG. 3), the validity of a plurality of transactions associated with the circulation of resins occurring between the two companies that do not perform a direct transaction with each other. In this case, for example, by comparing shipment amount information on the resins (a3) shown by shipment information on a first company (the recycling company) with delivery amount information on the resins (b3) shown by delivery information on a second company (the container manufacturing company), the transaction determination unit 246 may determine that, when the delivery amount information on the resins (b3) does not exceed the shipment amount information on the resins (a3), the transaction of resins occurring between the first company (the recycling company) and the second company (the container manufacturing company) (that is, the transaction between the recycling company and the resin maker and the transaction between the resin maker and the container manufacturing company) is valid in the supply chain. Further, when using the above approval information, the transaction determination unit 246 may determine, on the basis of shipment information and delivery information on two companies that do not perform a direct transaction with each other, the validity of a plurality of transactions associated with the circulation of resins occurring between the two companies in the supply chain.

A determination (first determination) as to the validity of a transaction on the basis of shipment information and delivery information on companies that perform a direct transaction with each other and a determination (second determination) as to the validity of a transaction on the basis of shipment information and delivery information on two companies that do not perform a direct transaction with each other in a supply chain are described above. The transaction determination unit 246 may determine, instead of determining the validity of a plurality of transactions associated with the circulation of resins occurring between two companies that do not perform a direct transaction with each other on the basis of only a second determination, determine the validity of a transaction on the basis of a first determination for each of a plurality of transactions associated with the circulation of the resins occurring between the two companies that do not perform a direct transaction with each other in addition to the second determination. In this case, the transaction determination unit 246 may determine that, when the determination results of the first determination and the second determination show the validity of the transactions, the plurality of transactions associated with the circulation of the resins occurring between the two companies that do not perform a direct transaction are valid as a whole.

The consensus building processing unit 248 transmits target data to another node apparatus 240 to be shared and performs prescribed consensus building processing. As a consensus building algorithm in the consensus building processing, an arbitrary algorithm in a blockchain such as PBFT and Endorsement-Ordering-Validation is employable. The consensus building processing unit 248 verifies the validity of target data in the consensus building processing. When a consensus is built in the consensus building processing by the consensus building processing unit 248, target data is transmitted to another node apparatus 240 and stored in the respective storage units 250 of the own machine and the other node apparatus 240. As a result, the consensus data is shared and separately stored in the plurality of node apparatuses 240.

For example, when a consensus is built after the consensus building processing unit 248 performs consensus building processing on shipment information received by the shipment information acquisition unit 242, delivery information received by the delivery information acquisition unit 244, and transaction validity information generated by the transaction determination unit 246, the consensus building processing unit 248 may perform control to store the information in the storage units 250 of the own machine and another node apparatus 220.

The storage unit 250 stores data for which a consensus has been built by the consensus building processing unit 248. The storage unit 250 stores, for example, information for which a consensus has been built among shipment information, delivery information, and transaction validity information.

The shipment information, the delivery information, and the transaction validity information may be, every time recycled resins or resin products are traded or transferred between the companies shown in FIG. 3, stored in the storage unit 250 according to input to terminal apparatuses 10 by the companies. Further, the information stored in the storage unit 250 is stored in the storage unit 250 so that the supply chain of raw material resins or resin products is traceable. For example, the shipment information, the delivery information, and the transaction validity information are stored in the storage unit 250 so that the trade or transfer of the recycled resins or resin products between the companies is traceable by identification information on the recycled resins. In this case, the supply information that is information on the supply chain of the resin products using the recycled resins associated with the same identification information may be acquired from the storage unit 250 and transmitted to and displayed on the terminal apparatus 10.

<Processing Flow>

An example of a processing flow performed by the blockchain network 20 in the present embodiment will be described with reference to FIG. 11. The processing is realized when the processor 101 of a node apparatus 240 reads and runs a computer program stored in the storage device 105. Note that the detailed descriptions of processing steps that have been described in detail above among respective processing steps in the processing will be omitted here.

First, in step S301, the processor 101 receives, from a first company via a first terminal apparatus, shipment information with respect to the transaction of at least resin products or resins including raw material resins in a supply chain in which a plurality of companies participate, the shipment information including at least a part of identification information on resins shipped by the first company, shipment destination information on the resins, shipment amount information on the resins, and shipment timing information on the resins.

In step S302, the processor 101 receives, from a second company via a second terminal apparatus, delivery information corresponding to the shipment information on the first company received in step S301 among delivery information on resins delivered to the second company.

In step S303, the processor 101 makes a transaction determination that is a determination as to the validity of a transaction on the basis of the shipment information and the delivery information received in steps S301 and S302.

The processing proceeds to step S305 when it is determined that the transaction is valid (Yes in step S304). Otherwise (No in step S304), the processing shown in FIG. 11 ends.

In step S305, the processor 101 generates transaction validity information showing the result of the transaction determination in step S303.

In step S306, the processor 101 performs consensus building processing for the transaction validity information generated in step S305. The contents of the consensus building processing are described above.

Figure 11:
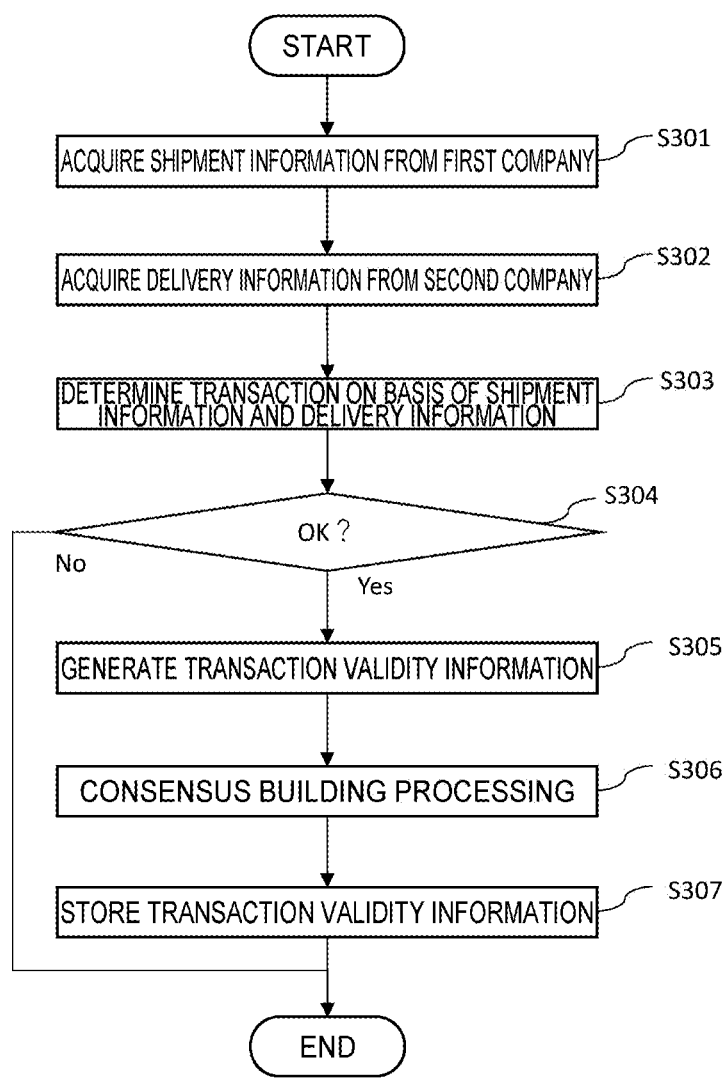
FIG. 11 is a flowchart showing an example of a processing flow according to the third embodiment.

In step S307, the processor 101 stores the transaction validity information for which the consensus has been built in the consensus building processing of step S306 in the storage device 105, and ends the processing shown in FIG. 11.

Note that the transaction validity information is stored in the storage device 105 only when it is determined in step S303 that the transaction is valid in the processing shown in FIG. 11. However, even when it is determined that the transaction is not valid, transaction validity information showing the fact may be stored in the storage device 105.

Modified Examples

A program for implementing the information processing system 1 (or the terminal apparatuses 10, the blockchain network 20, and the node apparatuses 240) in the present embodiment can be installed or loaded into a computer via various recording media such as an optical disk, a magnetic disk, and a semiconductor memory or by being downloaded via a communication network or the like.

Further, the blockchain network 20 in the present embodiment may be replaced by another configuration such as a server apparatus, cloud computing, and edge computing that stores data and performs processing. In this case, the server apparatus or the like has configurations like the shipment information acquisition unit 242, the delivery information acquisition unit 244, the transaction determination unit 246, and the storage unit 250 shown in FIG. 10. Note that information for which a consensus has been built by the consensus building processing unit 248 is stored in the storage unit 250 in the present embodiment, but information for which a consensus has not been built is stored in the storage unit 250 in the present modified example.

4. Fourth Embodiment

The present embodiment is an embodiment associated with the first embodiment and realized in combination with the first embodiment. In the present embodiment, other authentication conditions are applied in addition to or instead of the authentication conditions described in the first embodiment for the authentication of recycled products.

The contents of the present embodiment that will be described below are appropriately applicable to other respective embodiments. In the present embodiment, the same configurations as those of other embodiments will be appropriately denoted by the same symbols, and their descriptions will be omitted or simplified.

The information processing system described above with reference to FIG. 1 may be applied to the present embodiment, but an information processing system according to the present embodiment may include a manufacturing apparatus used to manufacture resin products.

Figure 12:
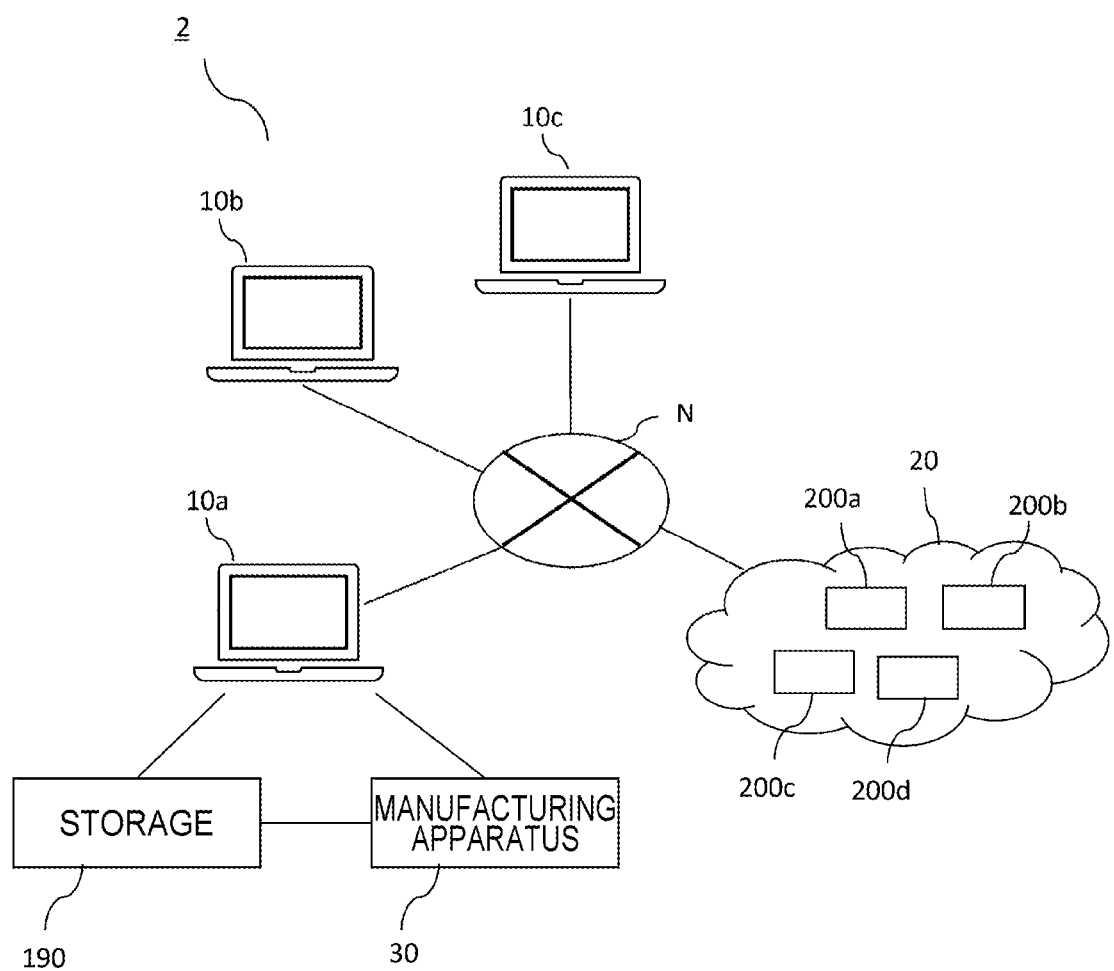
FIG. 12 is a conceptual diagram showing an example of the configurations of an information processing system according to a fourth embodiment.

An information processing system 2 applicable to the present embodiment will be described with reference to FIG. 12. As shown in FIG. 12, the information processing system 2 includes terminal apparatuses 10a, 10b, and 10c, a blockchain network 20, a manufacturing apparatus 30, and a storage 190. That is, the information processing system 2 includes the manufacturing apparatus 30 in addition to the configurations of the information processing system 1 shown in FIG. 1. The terminal apparatuses 10a, 10b, and 10c and the blockchain network 20 are communicable with each other via a network N. The terminal apparatus 10a, the manufacturing apparatus 30, and the storage 190 are communicable with each other via the network N. Further, it is also possible to perform communication between the blockchain network 20 and the manufacturing apparatuses 30 without the terminal apparatuses 10.

The manufacturing apparatus 30 is an apparatus used to manufacture resin products from raw materials including recycled resins. A method for manufacturing resin products using the manufacturing apparatus 30 has, for example, the step of kneading and extruding raw materials including recycled resins. The raw materials may include virgin resins besides the recycled resins.

Figure 13:
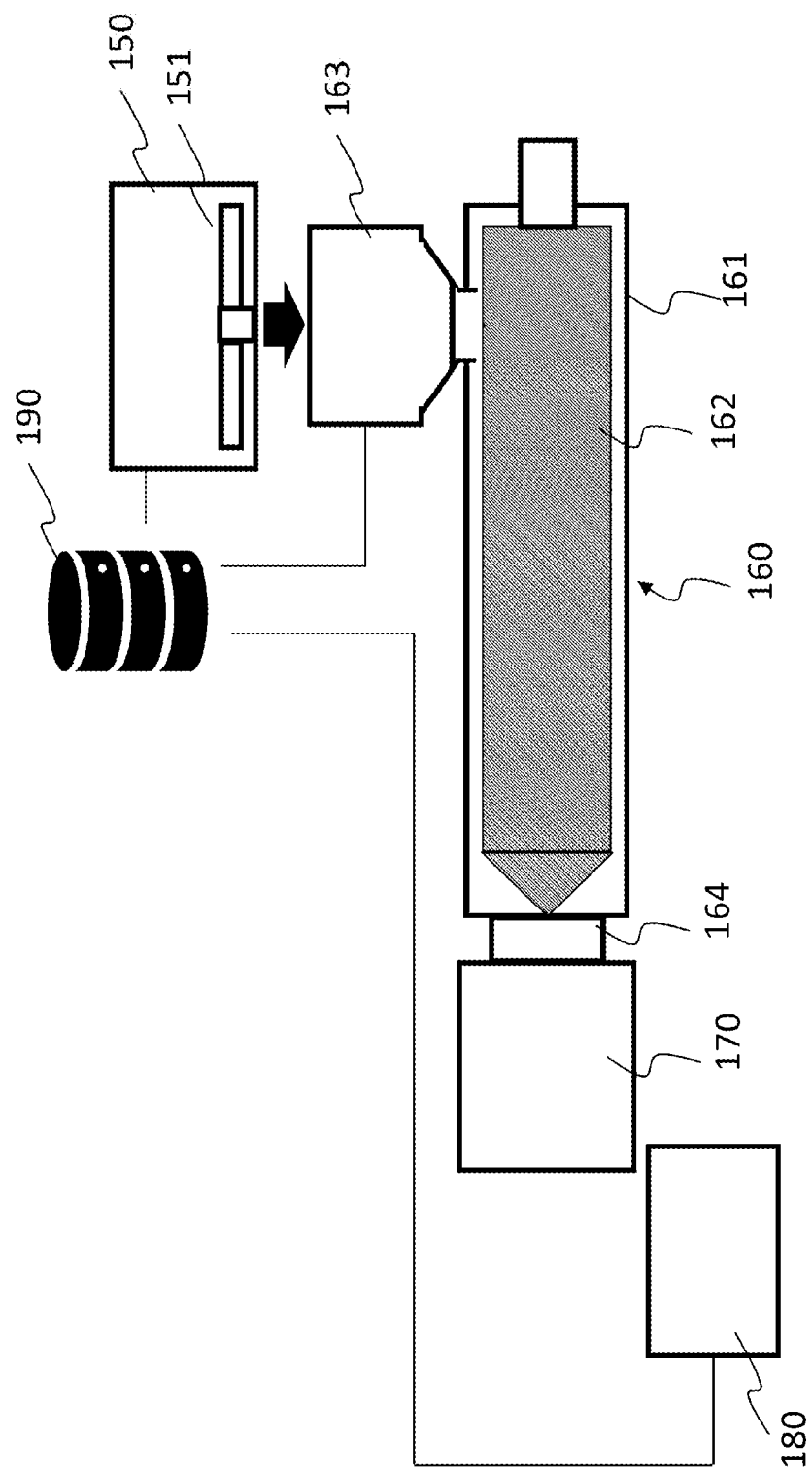
FIG. 13 is a conceptual diagram for describing the configurations of a manufacturing apparatus according to an embodiment.

An example of the schematic configuration of the manufacturing apparatus 30 will be described with reference to FIG. 13. The manufacturing apparatus 30 includes a mixer 150, an extruder 160, a cutter 170, and a product container 180. The manufacturing apparatus 30 is communicably connected to the storage 190. As a modified example, the manufacturing apparatus 30 may include the storage 190.

The mixer 150 includes a stirring blade 151 and a weighing sensor 152 not shown inside its housing. The weighing sensor 152 is provided in the manufacturing apparatus 30 to be able to weigh the weight of recycled resins (that is, the use amount of the recycled resins used to manufacture resin products) put into the mixer 150. The manufacturing apparatus 30 transmits information on the use amount of the recycled resins weighed by the weighing sensor 152 to the storage 190. The recycled resins used to manufacture the resin products may be recycled resins of one lot or recycled resins of a plurality of lots. When the recycled resins of a plurality of lots are put and used, the total weight of the put recycled resins is weighed after putting the recycled resins of the respective lots and information on the weight is transmitted to the storage 190. The storage 190 stores the received information on the weight of the recycled resins in association with lot information on the recycled resins (or other identification information for identifying the recycled resins). The storage 190 is a storage apparatus configured to include a storage medium such as a hard disk.

The extruder 160 includes a housing 161, a screw 162, and a hopper 163. The screw 162 is provided inside the housing 161. The hopper 163 is provided to be able to introduce raw materials into the housing 161 from the outside. A heater (not shown) is provided in the housing 161 and configured to be able to increase the temperature inside the housing 161 to dissolve recycled resins. The hopper 163 includes a weighing sensor 1631 (not shown) that weighs raw materials introduced into the housing 161. The extruder 160 includes a die 164 that processes kneaded resins into a rod shape. Recycled resins stirred by the mixer 150 described above are put into the hopper 163, and the amount of the recycled resins put into the hopper 163 is measured by the weighing sensor 1631. Information on the measurement amount is transmitted to the storage 190. The storage 190 stores the received information on the measurement amount in association with identification information on recycled resins such as lot numbers of corresponding recycled resins.

Recycled resins introduced into the housing 161 are kneaded by the screw 162, extruded by the die 164, and processed into a rod shape. The recycled resins processed into a rod shape are delivered to the cutter 170 that will be described later.

The cutter 170 includes a cutting blade (not shown) that cuts off rod-shaped recycled resins. The rod-shaped recycled resins are cut off short and formed into a pellet shape. Recycled resin pellets obtained through the above steps are accommodated in the product container 180 as resin products.

The storage 190 may store information on the manufacturing amount of resin products and information on the discard amount of recycled resins during the manufacturing of the resin products in addition to the putting amount (use amount) of the recycled resins into the mixer 150 and the hopper 163.

In this case, the manufacturing amount of resin products accommodated in the product container 180 may be measured by the weighing sensor 1801 (not shown) provided in the product container 180. Information on the measured manufacturing amount may be transmitted from the weighing sensor 1801 to the storage 190 and stored in the storage 190 together with identification information on recycled resins serving as the raw materials of the resin products.

Further, in the manufacturing apparatus 30, a weighing sensor 1801 (not shown) may be provided at a position such as the product container 180 at which it is possible to measure the discard amount of recycled resins during the manufacturing of resin products by the manufacturing apparatus 30, and the discard amount of the recycled resins may be measured by the weighing sensor 1801. Information on the measured discard amount may be transmitted from the weighing sensor 1801 to the storage 190 and stored in the storage 190 together with identification information on the recycled resins serving as the raw materials of the resin products. As the discarded recycled resins, resin products that are out of specifications or resins remaining inside the housing 161 when the manufacturing apparatus 30 is suspended are assumed.

Information stored in the storage 190 or the node apparatuses 200 is, for example, used to determine whether authentication conditions that will be described later are satisfied. The information stored in the storage 190 may be transmitted to the blockchain network 20 from the storage 190 or the manufacturing apparatus 30 and stored in a storage unit 212 of any of the node apparatuses 200.

Here, in the present embodiment, authentication is given to resin products in the same manner as the first embodiment. For example, in the information processing system 2, a receiving information acquisition unit 202 acquires information on the receiving amount of recycled resins in the manufacturing entity of resin products, and a sending information acquisition unit 204 acquires information on the sending amount of resin products using recycled resins in the above manufacturing entity or a different manufacturing entity from the storage 190. When target resin products satisfy authentication conditions based on the above acquired information on the receiving amount and the sending amount, the authentication unit 208 gives authentication to the resin products. Further, a method for authenticating recycled products in the present embodiment includes processing steps by respective function configurations including the receiving information acquisition unit 202, the sending information acquisition unit 204, and the authentication unit 208.

Further, a receiving amount acquired by the receiving information acquisition unit 202 includes the delivery amount of recycled resins in the manufacturing company of resin products, and a sending amount acquired by the sending information acquisition unit 204 includes the shipment amount of resin products using the recycled resins.

<Outline from Delivery of Recycled Resins to Shipment of Resin Products>

Figure 14:
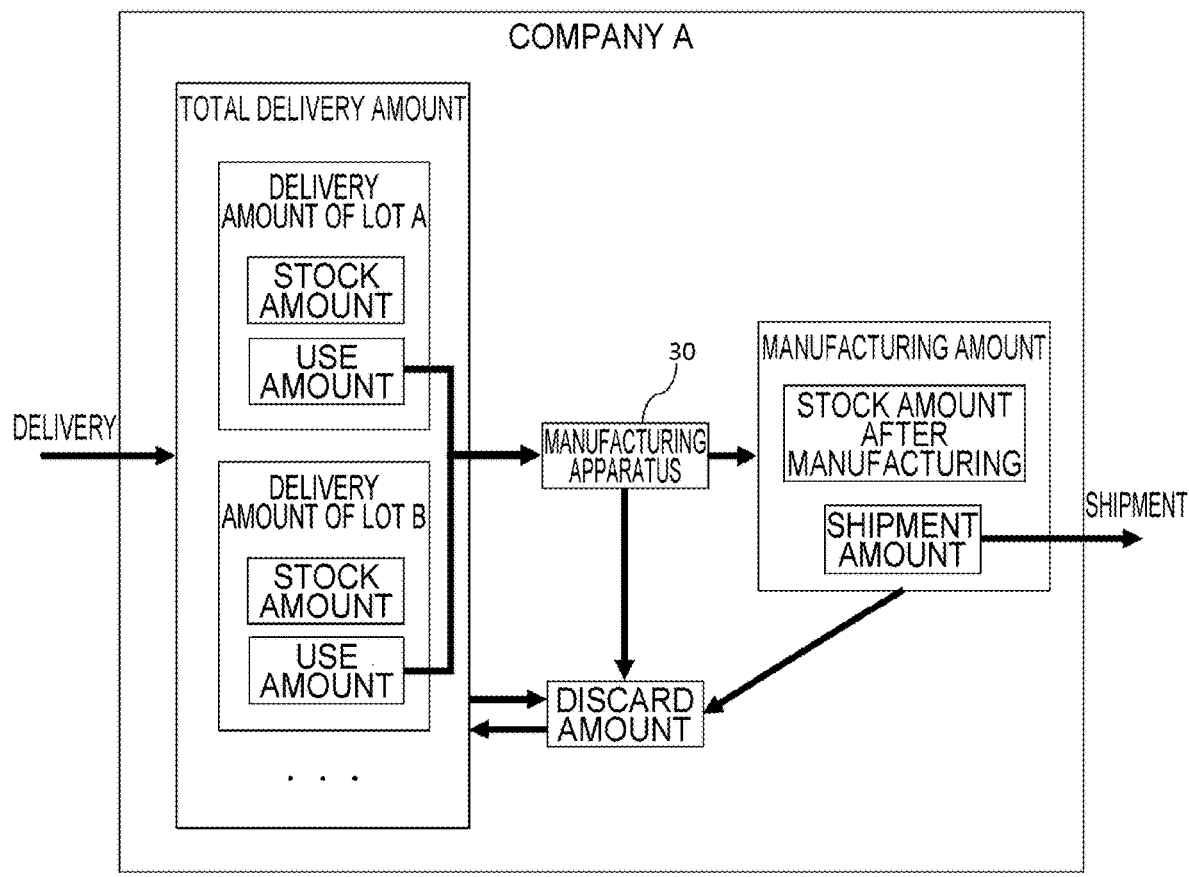
FIG. 14 is a conceptual diagram for describing processing according to an embodiment.

An example of a flow from the delivery of recycled resins to the shipment of resin products in a company that manufactures the resin products in the present embodiment will be schematically described with reference to FIG. 14. Recycled resins used to manufacture resin products are delivered to a company A. The delivered recycled resins are put into a manufacturing apparatus 30 and used to manufacture resin products. Among the delivered recycled resins, recycled resins that are not used are managed as stock. The manufactured resin products are shipped. Among the manufactured resin products, resin products that are not shipped are managed as stock after manufacturing (stock of resin products).

Information on the above respective amounts of the above delivery, stock, use, manufacturing, stock after manufacturing, and shipment is stored and managed in the storage 190 or the node apparatuses 200 in the units of lots of corresponding recycled resins (or in the units of other identification information for identifying recycled resins or resin products, the same applies to other descriptions in the present disclosure). That is, the information on the respective amounts of the delivery, stock, use, stock after manufacturing, and shipment is stored and managed in the storage 190 or the node apparatuses 200 as a delivery amount, a stock amount, a use amount, a manufacturing amount, a stock amount after manufacturing, and a shipment amount in the units of lots.

Further, the discard of recycled resins sometimes occurs for any reason until the shipment of resin products after the delivery of the recycled resins. For example, some recycled resins are discarded without being used for manufacturing after being delivered. Further, some raw materials including recycled resins put into the manufacturing apparatus 30 to be used are discarded during the manufacturing of resin products. In addition, after resin products are manufactured, a part of the resin products is discarded without being shipped. The amount of the above discard is stored and managed in the storage 190 or the node apparatuses 200 in the units of lots of corresponding recycled resins (or in the units of identification information on other recycled resins) as information on a discard amount. When discarded recycled resins or resin products described above are recycled (reworked) and used as the raw materials of resin products, the receiving information acquisition unit 202 may acquire the amount of the recycled resins delivered or used as the raw materials in the discard amount as a receiving amount.

For example, information on the discard amount of recycled resins discarded before the manufacturing of resin products after delivery may be input via input I/Fs 107 or the like of the terminal apparatuses 10 and transmitted from the terminal apparatuses 10 to the node apparatus 200 to be stored and managed. Raw materials including recycled resins discarded during the manufacturing of resin products by the manufacturing apparatus 30 may be measured by a weighing sensor in the manufacturing apparatus 30, and information on the specified weight may be transmitted to the node apparatuses 200 to be stored and managed. After the delivery, information on the discard amount of resin products discarded after being manufactured may be input via the input I/Fs 107 or the like of the terminal apparatuses 10 and transmitted from the terminal apparatuses 10 to the node apparatuses 200 to be stored and managed.

In the present embodiment, the above receiving amount, the stock amount, the use amount, the manufacturing amount, the stock amount after manufacturing, the shipment amount, or the discard amount may be the accumulated delivery amount of recycled resins, the accumulated stock amount, the accumulated use amount, the accumulated manufacturing amount, the accumulated stock amount after manufacturing, the accumulated shipment amount, or the accumulate discard amount of recycled resins associated with the same identification information for identifying the recycled resins of a prescribed unit.

<Authentication Conditions>

An example of conditions (authentication conditions) for authenticating resin products as recycled products in the present embodiment and their preconditions will be described below. The authentication conditions in the present embodiment are independently employable for the authentication and also employable in combination with the authentication conditions described in other embodiments.

Information on the receiving amount of recycled resins in the manufacturing entity of resin products acquired by the receiving information acquisition unit 202 may include information on the use amount of recycled resins used in the processing of the recycled resins. The information on the use amount of the recycled resins acquired by the receiving information acquisition unit 202 may be based on a weighing result by the above weighing sensor provided in the manufacturing apparatus 30 to be able to weigh the use amount of the recycled resins. The above authentication conditions may include a condition that the above use amount does not exceed the above delivery amount. The use amount of the recycled resins used in the processing of the recycled resins includes, for example, the amount of putting the recycled resins into the manufacturing apparatus 30 to manufacture resin products.

The receiving information acquisition unit 202 may acquire, as the above information on the receiving amount, the above information on the use amount of recycled resins for manufacturing resin products from the manufacturing apparatus 30. As described above, the manufacturing apparatus 30 is an apparatus that processes recycled resins to obtain resin products. For example, the receiving information acquisition unit 202 acquires the above information on the use amount directly transmitted to the blockchain network 20 from the manufacturing apparatus via the storage 190 or the storage unit 212 as the above receiving amount.

Information on the sending amount of resin products using recycled resins in a manufacturing entity acquired by the sending information acquisition unit 204 may include information on the manufacturing amount of processed resin products. The manufacturing amount of the processed resin products may indicate the manufacturing amount of resin products manufactured when recycled resins are processed in the manufacturing apparatus 30. The above authentication conditions may include a condition that the above manufacturing amount does not exceed the above use amount.

The sending information acquisition unit 204 may acquire, as the above sending amount, information on the manufacturing amount of resin products from the manufacturing apparatus 30. As described above, the manufacturing apparatus 30 is an apparatus that processes recycled resins to obtain resin products. For example, the sending information acquisition unit 204 acquires the above information on the manufacturing amount directly transmitted to the blockchain network 20 from the manufacturing apparatus 30 via the storage 190 or the storage unit 212 as the above sending amount.

The information on the receiving amount of recycled resins in the manufacturing entity of resin products acquired by the receiving information acquisition unit 202 may include information on a raw material stock amount that is the stock amount of recycled resins. The stock amount of recycled resins is, for example, the stock amount of recycled resins used in the manufacturing of resin products. The above authentication conditions may include a condition that the sum total of the above use amount and the above raw material stock amount does not exceed the above delivery amount of the recycled resins.

The Information on the sending amount of resin products using recycled resins in the manufacturing entity acquired by the sending information acquisition unit 204 may include information on a stock amount after manufacturing about resin products. Further, the information on the sending amount acquired by the sending information acquisition unit 204 may include information on the manufacturing amount of resin products in a manufacturing entity. Further, the information on the sending amount acquired by the sending information acquisition unit 204 may include information on the shipment amount of resin products. The above authentication conditions may include a condition that the sum total of the above stock amount after manufacturing and the above shipment amount does not exceed the manufacturing amount.

The information on the receiving amount of recycled resins in the manufacturing entity of resin products acquired by the receiving information acquisition unit 202 may include, instead of the delivery amount of recycled resins, information on a shipment amount in a manufacturing entity that has shipped the recycled resins. Note that a value stored in the blockchain network may be used as the shipment amount. Since a shipment amount from another manufacturing entity is handled as a delivery amount, the invalid input of a delivery amount can be prevented.

When the above authentication conditions are applied in combination, the following combinations may be employed. As preconditions, the receiving information acquisition unit 202 acquires information on the delivery amount of recycled resins in a company that manufactures resin products and information on the use amount of recycled resins used in processing to manufacture resin products from the manufacturing apparatus 30. The sending information acquisition unit 204 acquires information on the shipment amount of resin products in the manufacturing company of the resin products. The authentication unit 208 may determine whether resin products satisfy authentication conditions on the basis of information on the above delivery amount, the above use amount, and the above shipment amount. When determining that the authentication conditions are satisfied, the authentication unit 208 gives authentication to target resin products (for example, shipped resin products). For example, when authentication is given to target resin products by the authentication unit 208, information showing that the target resin products are authenticated as recycled products is stored in the storage unit 212.

The above authentication conditions may include at least one of the following conditions or a combination of at least a part of these conditions.

The above delivery amount≥the above shipment amount+the above raw material stock amount+ the above discard amount before manufacturing, during manufacturing, and after manufacturing  (Condition A)

The above use amount≥the above manufacturing amount+the above discard amount during manufacturing  (Condition B)

The above delivery amount≥the above use amount+ the above raw material stock amount+the above discard amount before manufacturing  (Condition C)

The above manufacturing amount≥the above shipment amount+the above stock amount after manufacturing+the above discard amount after manufacturing  (Condition D)

<Processing Flow>

An example of a processing flow that is performed in the information processing system 2 in a period from the delivery of recycled resins to the authentication of resin products in the present embodiment will be described with reference to FIG. 15. The processing is realized when the processors of the respective apparatuses included in the information processing system 2 read and run a computer program stored in the storage unit. Note that the detailed descriptions of processing steps that have been described in detail above among respective processing steps in the processing will be omitted here.

In step S401, a terminal apparatus 10 performs processing for the delivery of recycled resins. For example, by reading delivery forms attached to the packages or the like of delivered recycled resins, the terminal apparatus 10 acquires information on the delivery amount of the recycled resins together with identification information (for example, lot information) on the recycled resins. For example, by reading delivery forms attached to the packages or the like of delivered recycled resins, the terminal apparatus 10 acquires information on the delivery amount of the recycled resins together with identification information on the recycled resins (for example, lot information on the recycled resins). The terminal apparatus 10 may include a reading device such as an image sensor and a signal sensor and acquire the information on the delivery amount and the identification information on the recycled resins from the delivery forms with the reading device. The reading of the reading device may be automatically performed or may be performed according to user operation. The terminal apparatus 10 transmits the acquired information on the delivery amount and the identification information on the recycled resins to the storage 190. The acquired information on the delivery amount is used in the authentication processing of the blockchain network 20 that will be described later.

In step S402, the storage 190 stores the information on the delivery amount and the identification information on the recycled resins received from the terminal apparatus 10 in association with each other.

In step 403, the manufacturing apparatus 30 measures the amount of the recycled resins put into the manufacturing apparatus 30 as a use amount by a weighing sensor and transmits the information on the use amount to the storage 190. Further, the manufacturing apparatus 30 measures the amount of resin products manufactured by the manufacturing apparatus 30 as a manufacturing amount by a weighing sensor and transmits information on the manufacturing amount to the storage 190.

In step S404, the storage 190 stores the information on the use amount and the manufacturing amount received from the manufacturing apparatus 30.

In step S405, the terminal apparatus 10 performs processing for the shipment of the resin products. For example, by reading shipment forms attached to the packages or the like of the resin products manufactured by the manufacturing apparatus 30 and shipped, the terminal apparatus 10 acquires the information on the shipment amount of the resin products together with identification information on the resin products (for example, lot information on the resin products). For example, by reading shipment forms attached to the packages or the like of the shipped resin products, the terminal apparatus 10 acquires information on the shipment amount of the resin products together with identification information on the resin products. As described above, the terminal apparatus 10 may include a reading device such as an image sensor and a signal sensor and acquire the information on the shipment amount and the identification information on the resin products from the delivery forms. The reading of the reading device may be automatically performed or may be performed according to user operation. The terminal apparatus 10 transmits the acquired information on the shipment amount and the identification information on the resin products to the storage 190. The acquired information on the shipment amount is used in the authentication processing of the blockchain network 20 that will be described later In step S406, the storage 190 specifies information including the information on the shipment amount and the identification information on the resin products as product-relating amount data on the basis of the information received from the terminal apparatus 10. The storage 190 stores the received information on the shipment amount and the identification information on the resin products in association with each other. Further, the storage 190 stores the identification information on the recycled resins used in the manufacturing of the resin products in association with the identification information on the resin products. The specification of the recycled resins used in the manufacturing of the resin products is performed by an arbitrary method. For example, in the shipment processing of step S405, the corresponding relationship between the identification information on the resin products and the identification information on the recycled resins may be specified on the basis of information acquired from the shipment forms, and information on the corresponding relationship may be transmitted to the storage 190.

In step S407, the storage 190 transmits information necessary for the authentication of the resin products to the terminal apparatus 10 as the product-relating amount data.

The information necessary for the authentication of the resin products includes, for example, information used in the determination of authentication conditions as to whether the resin products are authenticated as recycled products. The product-relating amount data transmitted in step S407 includes, for example, information on the use amount of the recycled resins and the manufacturing amount of the resin products stored in the storage 190 and the identification information on the resin products.

In step S408, the terminal apparatus 10 generates authentication target data on the basis of the product-relating amount data received from the storage 190. The authentication target data is data relating to the resin products that is a target for which a determination is made as to whether the resin products are recycled products. The authentication target data includes, for example, the identification information on the resin products and information (for example, the information on the delivery amount, the use amount, and the shipment amount) for determining whether the resin products satisfy the authentication conditions.

In step S409, the terminal apparatus 10 transmits the authentication target data generated in step S408 to the blockchain network 20. The transmission is performed according to, for example, user operation on the terminal apparatus 10.

In step S410, the blockchain network 20 performs authentication processing on the basis of the authentication target data. The authentication processing is performed by the node apparatuses 200 included in the blockchain network 20. For example, the authentication processing is performed as follows.

Among the plurality of node apparatuses 200, a node apparatus 200*a* acquires information (for example, information on the delivery amount of recycled resins, the use amount of the recycled resins, and the shipment amount of the resin products) included in authentication data received from the terminal apparatus 10. By determining whether target resin products satisfy prescribed authentication conditions on the basis of the acquired information, the node apparatus 200*a* performs authentication processing for the target resin products. On the premise that the resin products satisfy the authentication conditions, the node apparatus 200*a* transmits target data to another node apparatus 200 in order to share the data (target data) showing that the resin products satisfy the authentication conditions with the other node apparatus 200. Since consensus building processing to share the target data has been described above, its description will be omitted here.

In step 411, the blockchain network 20 transmits the result of the authentication processing in step S410 to the terminal apparatus 10. The result of the authentication processing includes information showing whether the target resin products satisfy the authentication conditions.

In step S412, the terminal apparatus 10 receives the result of the authentication processing transmitted from the blockchain network 20 (that is, the node apparatuses 200).

In step S413, the terminal apparatus 10 outputs the received result of the authentication processing. The output of the result of the authentication processing includes, for example, the output of display to a display device 111 or the output of transmission to an external device.

The result of the authentication processing or data showing that the resin products satisfy the authentication conditions may be issued as a token, may be output as a hash value, or may be output as an image (badge) showing that the resin products are authenticated. Further, the result of the authentication processing or the data showing that the resin products satisfy the authentication conditions may be printed and output as an authentication mark or the like on documents relating to the resin products such as the delivery notes, the forms, and the labels of the resin products to enable the understanding of the result of the authentication processing. Further, the result of the authentication processing or the data showing that the resin products satisfy the authentication conditions may be electronically output to an RFID tag, an e-mail, a code image (for example, a barcode), or the like to enable the understanding of the result of the authentication processing.

Figure 15:
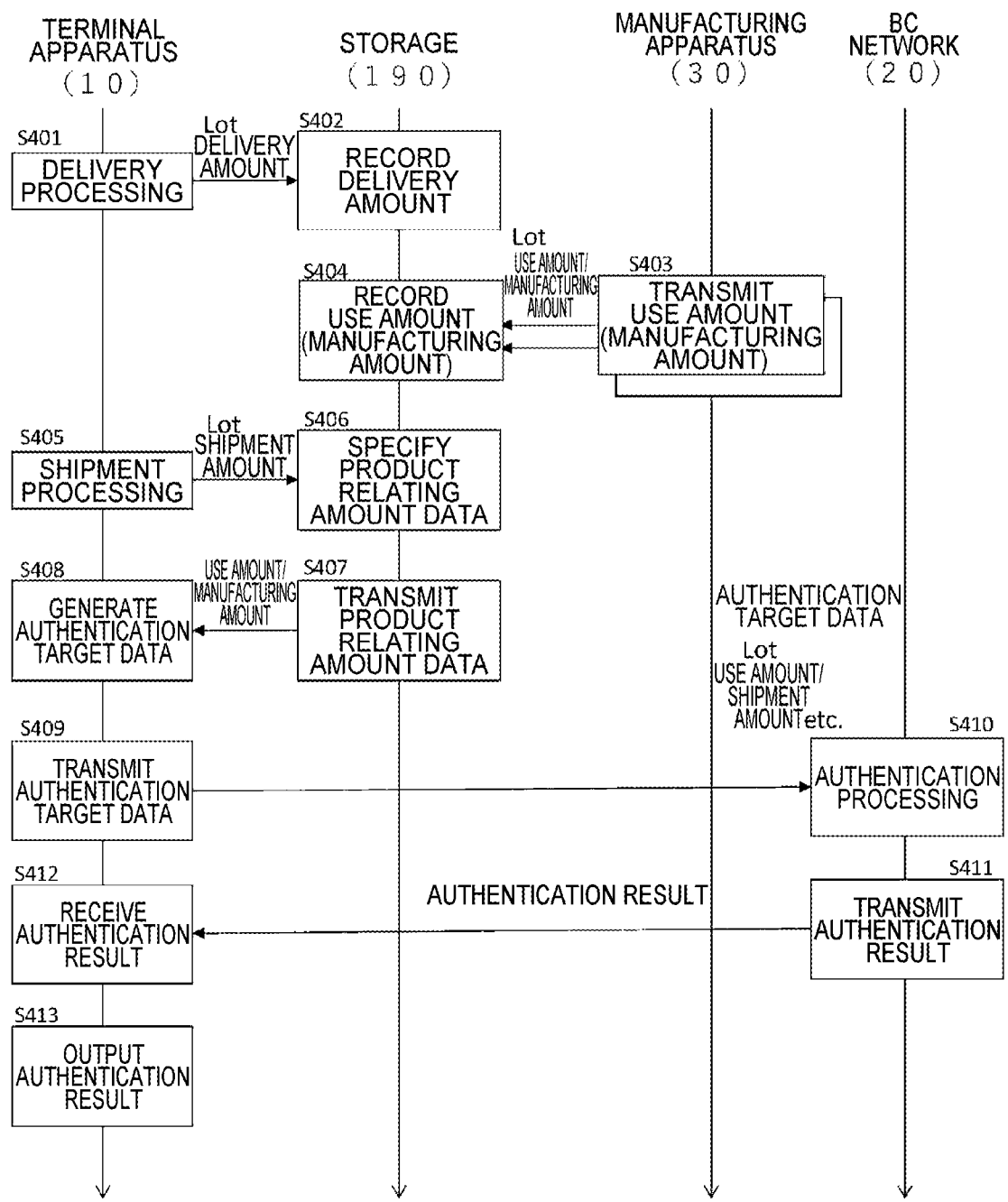
FIG. 15 is a sequence diagram showing an example of a processing flow according to the fourth embodiment.

According to the processing shown in FIG. 15 as described above, the system including the terminal apparatus 10 functions as an authentication application system. Specifically, the terminal apparatus 10 acquires, as information on the receiving amount of recycled resins in the manufacturing entity of resin products, information on the delivery amount of the recycled resins (S401) and information on the use amount of the recycled resins (S408). The terminal apparatus 10 acquires, as information on the sending amount of the resin products using the recycled resins in the above manufacturing entity (company), information on the shipment amount of the resin products (S405). The terminal apparatus 10 acquires, as information on the sending amount of the resin products using the recycled resins in a manufacturing entity (for example, the manufacturing apparatus 30) different from the above manufacturing entity, information on the manufacturing amount of the resin products (S407). The terminal apparatus 10 transmits authentication target data including the above sending amount and the above receiving amount to the blockchain network 20 (S409). The terminal apparatus 10 receives an authentication result showing whether authentication conditions based on the information on the sending amount and the receiving amount are satisfied from the blockchain network 20 (S412).

Modified Examples

A program for implementing the information processing system 1 or 2 in the present embodiment or the apparatuses included in the system can be installed or loaded into a computer via various recording media such as an optical disk, a magnetic disk, and a semiconductor memory or by being downloaded via a communication network or the like.

Further, an example of a case in which resin products are manufactured by one manufacturing apparatus is described above in the present embodiment. However, the information processing system 2 may include a plurality of manufacturing apparatuses 30, and resin products may be manufactured by the plurality of manufacturing apparatuses 30.

A receiving amount and a sending amount in a case in which resin products are manufactured by a plurality of manufacturing apparatuses 30 will be described with reference to FIG. 16. FIG. 16 shows an example of a manufacturing process in a case in which raw materials X1, X2, Y1, Y2, and Z1 are put and resin products Z are manufactured by manufacturing apparatuses 30a, 30b, and 30c.

At least a part of the raw materials X1, X2, Y1, Y2, and Z1 includes recycled resins. A part of the raw materials X1, X2, Y1, Y2, and Z1 may include virgin resins or additives. In the example shown in FIG. 16, the putting amount of the recycled resins included in the raw materials X1, X2, Y1, Y2, and Z1 put into the manufacturing apparatuses 30a, 30b, and 30c is the use amount of the recycled resins for manufacturing the resin products Z. The use amount of the recycled resins is calculated on the basis of the use amounts of the respective raw materials and the contents of the recycled resins in the respective raw materials. The amount of the resin products Z manufactured by the manufacturing apparatus 30c is the manufacturing amount of the resin products. That is, in this example, the total amount of the recycled resins of the raw materials put into the respective manufacturing apparatuses is specified as the use amount of the recycled resins, and the amount of the totally-manufactured resin products is specified as the manufacturing amount in the manufacturing process of the resin products.

In the example shown in FIG. 16, the raw materials X1 and X2 are put into the manufacturing apparatus 30a to produce resins X'. Next, the resins X' and the raw materials Y1 an Y2 are put into the manufacturing apparatus 30b to produce resins Y'. Then, the resins Y' and the raw material Z1 are put into the manufacturing apparatus 30c to produce resins Z. In this example, the raw materials X1 and X2 may be resins, the raw materials Y1 and Y2 may be additives, and the raw material Z1 may be resins. In this case, laminated bodies in which the raw material Z1 showing resins are laminated on the resins Y' obtained by adding the raw materials Y1 and Y2 to the resins X' may be manufactured.

An example of the authentication of recycled products in a case in which the processing or the like of recycled resins is performed to manufacture resin products is described in the present embodiment. However, the processing in the present disclosure may also be applied to the authentication of recycled products in the manufacturing of chemical recycled products.

For example, a recycling ratio is assumed to be 100% when 100% of recycled naphtha converted into oil from a waste plastic material in chemical recycling is used. For example, a recycling ratio is assumed to be 10% when 10% of recycled naphtha and 90% of petroleum naphtha are used. Further, monomers obtained by opening polymerization from a raw material of 100% of recycled naphtha or 100% of a waste recycled material are assumed to be monomers having a recycling ratio of 100%. Note that resins polymerized from monomers having a recycling ratio of 100% are assumed to be recycled resins having a recycling ratio of 100%. Note that when a yield during polymerization is not 100%, for example, when a yield is 60 to 70%, a loss of 30 to 40% is handled as a waste.

The present invention is not limited to the above embodiments but can be carried out in various forms without departing from its gist. The above embodiments are only given for illustration in every respect and should not be construed in a limited way.

REFERENCE SIGNS LIST

1 Information processing system
10 Terminal apparatus
20 Blockchain network
200 Node apparatus
N Network

What is claimed is:

1. An authentication method for a recycled product performed by a computer system, the authentication method comprising:
   a first acquisition step of acquiring information on a receiving amount of a recycled resin in a manufacturing entity of a resin product from a terminal apparatus communicable with the computer system;
   a second acquisition step of i) acquiring information on a sending amount of a resin product using the recycled resin in the manufacturing entity from the terminal and ii) acquiring information on a manufacturing amount of the resin product from a manufacturing apparatus that processes the recycled resin to obtain the resin product;

a product stock amount acquisition step of acquiring information on a stock amount of the resin product after manufacturing;

a shipment amount acquisition step of acquiring a shipment amount of the resin product;

an authentication step of giving authentication to the resin product when an authentication condition based on the information on the sending amount and the receiving amount is satisfied by generating authentication information showing that the resin product is a recycled product; and an output step of transmitting a result of the authentication step to an external device, wherein:

the receiving amount comprises information indicating an amount of the recycled resin received by the manufacturing entity as raw materials for manufacturing the resin products, the sending amount comprises information indicating an amount of the recycled resin in the resin product shipped from the manufacturing entity or information indicating an amount of a recycling-authenticated resin product in the resin product shipped from the manufacturing entity under a mass balance approach, the manufacturing amount comprises information indicating an amount of the resin product manufactured by the manufacturing entity, the stock amount comprises information indicating an amount of the resin product remaining with manufacturing entity, the shipment amount comprises information indicating an amount of the resin product shipped from the manufacturing entity, the authentication condition comprises a first condition that the amount of the recycled resin, or the amount of recycling-authenticated resin product, in the sending amount does not exceed the amount of the recycled resin in the receiving amount, and the authentication condition includes a second condition that a sum total of the stock amount and the shipment amount, after shipment of the resin product from the manufacturing entity, does not exceed the manufacturing amount.

2. The authentication method according to claim 1, comprising:

a third acquisition step of acquiring information on a recycling ratio about the resin product, wherein the weight of the recycled resin in the resin product is calculated by multiplying a weight of the resin product by the recycling ratio.

3. The authentication method according to claim 1, wherein in the first acquisition step, information on a use amount of a recycled resin is acquired as the receiving amount from a manufacturing apparatus that processes the recycled resin to obtain a resin product.

4. The authentication method according to claim 1, further comprising:

a raw material stock amount acquisition step of acquiring information on a raw material stock amount that is a stock amount of a recycled resin in a manufacturing entity of the resin product, wherein the authentication condition further includes a condition to give authentication to the resin product that a sum total of the use amount and the raw material stock amount does not exceed a delivery amount of a recycled resin delivered to the manufacturing entity of the resin product.

5. The authentication method according to claim 4, wherein the delivery amount is an accumulated delivery amount of the recycled resin associated with same identification information for identifying the recycled resin of a prescribed unit.

6. The authentication method according to claim 5, wherein the shipment amount is an accumulated shipment amount of the resin product associated with same identification information for identifying the recycled resin of a prescribed unit.

7. The authentication method according to claim 1, wherein the manufacturing entity is a manufacturing apparatus of a resin product, the receiving amount is acquired based upon a use amount of the recycled resin that is used by the manufacturing apparatus, and the sending amount is acquired based upon a manufacturing amount of the resin product manufactured by the manufacturing apparatus using the recycled resin.

8. The authentication method according to claim 1, wherein the computer system includes a blockchain network including a plurality of node apparatuses, and each of the plurality of node apparatuses is configured to perform, with a control unit, consensus building processing in a blockchain to share information indicating the receiving amount and information indicating the sending amount with another of the node apparatuses, and store, in a storage unit, the information for which a consensus has been built by the consensus building processing.

9. An authentication system including a processor, wherein the processor is configured to perform:

a first acquisition step of acquiring information on a receiving amount of a recycled resin in a manufacturing entity of a resin product from a terminal apparatus communicable with the computer system;

a second acquisition step of i) acquiring information on a sending amount of a resin product using the recycled resin in the manufacturing entity from the terminal and ii) acquiring information on a manufacturing amount of the resin product from a manufacturing apparatus that processes the recycled resin to obtain the resin product;

a product stock amount acquisition step of acquiring information on a stock amount of the resin product after manufacturing;

a shipment amount acquisition step of acquiring a shipment amount of the resin product;

an authentication step of giving authentication to the resin product when an authentication condition based on the information on the sending amount and the receiving amount is satisfied by generating authentication information showing that the resin product is a recycled product; and an output step of transmitting a result of the authentication step to an external device, wherein:

the receiving amount comprises information indicating a receiving amount of the recycled resin as raw materials for manufacturing the resin products by the manufacturing entity, the sending amount comprises information indicating an amount of the recycled resin in the resin product shipped from the manufacturing entity or information indicating an amount of a recycling-authenticated resin product in the resin product shipped from the manufacturing entity under a mass balance approach, the manufacturing amount comprises information indicating an amount of the resin product manufactured by the manufacturing entity, the stock amount comprises information indicating an amount of the resin product remaining with manufacturing entity, the shipment amount comprises information indicating an amount of the resin product shipped from the manufacturing entity, the authentication condition comprises a first condition that the amount of the recycled resin, or the amount of recycling-authenticated resin product, in the sending amount does not exceed the amount of the recycled resin in the receiving amount, and the authentication condition includes a second condition that a sum total of the stock amount and the shipment amount, after shipment of the resin product from the manufacturing entity, does not exceed the manufacturing amount.

10. The authentication system according to claim 9, wherein the processor is configured to perform, a delivery amount acquisition step of acquiring information on a delivery amount of a recycled resin delivered to a manufacturing company of the resin product, and a use amount acquisition step of acquiring information on a use amount of a recycled resin used in the processing from the manufacturing apparatus which processes the recycled resin to obtain a resin product, and a shipment amount acquisition step of acquiring information on a shipment amount of the resin product shipped by a manufacturing company of the resin product, and perform, as the authentication step, an authentication step of determining, on a basis of the information on the delivery amount, the use amount, and the shipment amount, that the resin product satisfies an authentication condition when the authentication condition including a condition that the use amount does not exceed the delivery amount and the shipment amount does not exceed the delivery amount is satisfied.

11. The authentication system according to claim 10, wherein the manufacturing apparatus includes a weighing unit provided to be able to weigh the use amount of the recycled resin, and in the use amount acquisition step, the use amount is acquired on a basis of a weighing result by the weighing unit.

12. The authentication system according to claim 10, comprising:

a first reading device that reads a delivery form of the recycled resin, wherein in the delivery amount acquisition step, information on the delivery amount based on a reading result of the delivery form by the first reading device is acquired.

13. The authentication system according to claim 10, comprising:

a second reading device that reads a shipment form of a shipment amount of the resin product, wherein in the shipment amount acquisition step, information on the shipment amount based on a reading result of the shipment form by the second reading device is acquired.

14. An authentication application system including a processor, wherein the processor is configured to perform:

a first acquisition step of acquiring information on a receiving amount of a recycled resin in a manufacturing entity of a resin product;

a second acquisition step of i) acquiring information on a sending amount of a resin product using the recycled resin in the manufacturing entity and ii) acquiring information on a manufacturing amount of the resin product from a manufacturing apparatus that processes the recycled resin to obtain the resin product;

a product stock amount acquisition step of acquiring information on a stock amount of the resin product after manufacturing;

a shipment amount acquisition step of acquiring a shipment amount of the resin product;

an authentication application step of transmitting authentication target data including the sending amount and the receiving amount; and a receiving step of receiving an authentication result showing whether an authentication condition based on the information on the sending amount and the receiving amount is satisfied, wherein the receiving amount comprises information indicating a receiving amount of the recycled resin as raw materials for manufacturing the resin products by the manufacturing entity, the sending amount comprises information indicating an amount of the recycled resin in the resin product shipped from the manufacturing entity or information indicating an amount of a recycling-authenticated resin product in the resin product shipped from the manufacturing entity under a mass balance approach, the manufacturing amount comprises information indicating an amount of the resin product manufactured by the manufacturing entity, the stock amount comprises information indicating an amount of the resin product remaining with manufacturing entity, the shipment amount comprises information indicating an amount of the resin product shipped from the manufacturing entity, the authentication condition comprises a first condition that the amount of the recycled resin, or the amount of recycling-authenticated resin product, in the sending amount does not exceed the amount of the recycled resin in the receiving amount, and the authentication condition includes a second condition that a sum total of the stock amount and the shipment amount, after shipment of the resin product from the manufacturing entity, does not exceed the manufacturing amount.

15. The authentication application system according to claim 14, wherein the authentication application system further includes a manufacturing apparatus that processes a recycled resin to obtain a resin product, and the processor is configured to perform, in the first acquisition step, acquiring information on a use amount of the recycled resin from the manufacturing apparatus as the receiving amount, and in the second acquisition step, acquiring information on a manufacturing amount of the resin product as the sending amount.

16. The authentication application system according to claim 15, wherein
the manufacturing apparatus includes a weighing unit provided to be able to weigh the use amount of the recycled resin, and
in the use amount acquisition step,
the use amount is acquired on a basis of a weighing result by the weighing unit.

17. The authentication application system according to claim 14, wherein the processor is configured to perform:
a delivery amount acquisition step of acquiring information on a delivery amount of a recycled resin delivered to a manufacturing company of the resin product, and
a shipment amount acquisition step of acquiring information on a shipment amount of the resin product shipped by a manufacturing company of the resin product.

18. The authentication application system according to claim 16, comprising:
a first reading device that reads a delivery form of the recycled resin, and
in the delivery amount acquisition step, information on the delivery amount based on a reading result of the delivery form by the first reading device is acquired.

19. The authentication application system according to claim 16, comprising:
a second reading device that reads a shipment form of a shipment amount of the resin product, wherein
in the shipment amount acquisition step, information on the shipment amount based on a reading result of the shipment form by the second reading device is acquired.

* * * * *